United States Patent
Pajak et al.

(10) Patent No.: US 12,449,009 B2
(45) Date of Patent: Oct. 21, 2025

(54) BRAKE DISC INSERT ASSEMBLY

(71) Applicant: Honeywell International Inc., Charlotte, NC (US)

(72) Inventors: William E Pajak, Chesterton, IN (US); Jeffrey Eleff, South Bend, IN (US); Matthew Spray, Elkhart, IN (US)

(73) Assignee: Honeywell International Inc., Charlotte, NC (US)

( * ) Notice: Subject to any disclaimer, the term of this patent is extended or adjusted under 35 U.S.C. 154(b) by 423 days.

(21) Appl. No.: 18/179,172

(22) Filed: Mar. 6, 2023

(65) Prior Publication Data

US 2024/0301925 A1  Sep. 12, 2024

(51) Int. Cl.
| | |
|---|---|
| F16D 65/12 | (2006.01) |
| F16D 55/36 | (2006.01) |
| F16D 65/095 | (2006.01) |
| F16D 65/02 | (2006.01) |

(52) U.S. Cl.
CPC ............ F16D 55/36 (2013.01); F16D 65/095 (2013.01); F16D 65/123 (2013.01); *F16D 2065/1372* (2013.01); *F16D 2065/1392* (2013.01)

(58) Field of Classification Search
CPC ...... F16D 55/36; F16D 65/095; F16D 65/123; F16D 2065/1372; F16D 2065/1392
USPC ........................................ 188/218 A, 218 XL
See application file for complete search history.

(56) References Cited

U.S. PATENT DOCUMENTS

| | | |
|---|---|---|
| 2,790,516 A | 4/1957 | Joseph et al. |
| 3,757,907 A | 9/1973 | Crossman et al. |
| 3,919,916 A | 11/1975 | Alexander |
| 3,927,740 A * | 12/1975 | Zarembka ............. F16D 65/126 188/218 XL |
| 3,972,395 A | 8/1976 | Jannasch et al. |

(Continued)

FOREIGN PATENT DOCUMENTS

| | | |
|---|---|---|
| CN | 201080977 Y | 7/2008 |
| CN | 201884524 U | 6/2011 |

(Continued)

OTHER PUBLICATIONS

Xiong et al., "Study on the Forming Process and Deformation Behavior of Inner Ring in the Wheel Hub Bearing Based on Riveting Assembly," MDPI, Materials, vol. 12, No. 3785, DOI: 10.3390/ma12223785, Nov. 18, 2019, 15 pp.

(Continued)

*Primary Examiner* — Christopher P Schwartz
(74) *Attorney, Agent, or Firm* — Shumaker & Sieffert, P.A.

(57) ABSTRACT

In some examples, an insert assembly includes an insert, a rivet, and a washer configured to position on a brake disc. The insert is configured to position within a disc slot of the brake disc. The rivet shank is configured extend through a washer hole of the washer and a rivet slot of the insert to secure the insert to the brake disc. The washer is configured to be positioned between the insert and a rivet head of the rivet when the rivet shank extends into the brake disc. The rivet slot is configured to allow for the motion of the insert relative to the rivet in the tangential direction when torque is imparted through the disc slot via the insert. In some examples, the rivet is a solid rivet. In some examples, the rivet head is an orbitally riveted head fabricated using an orbital riveting tool.

20 Claims, 10 Drawing Sheets

(56) References Cited

U.S. PATENT DOCUMENTS

| | | | |
|---|---|---|---|
| 4,007,814 A * | 2/1977 | Berger | F16D 65/121 |
| | | | 188/218 XL |
| 4,465,165 A * | 8/1984 | Bok | F16D 65/126 |
| | | | 188/218 XL |
| 4,469,204 A * | 9/1984 | Bok | F16D 65/126 |
| | | | 188/218 XL |
| 4,527,668 A | 7/1985 | Davidson | |
| 4,557,356 A * | 12/1985 | Petersen | F16D 65/126 |
| | | | 188/218 XL |
| 4,585,096 A | 4/1986 | Bok | |
| 4,749,066 A | 6/1988 | Garrett et al. | |
| 4,863,001 A * | 9/1989 | Edmisten | F16D 65/126 |
| | | | 188/218 XL |
| 5,299,667 A | 4/1994 | Hammond | |
| 6,604,613 B2 * | 8/2003 | Burgoon | F16D 65/12 |
| | | | 188/218 XL |
| 6,854,634 B2 | 2/2005 | Litwinski et al. | |
| 8,210,328 B2 * | 7/2012 | Kano | F16D 65/12 |
| | | | 188/218 XL |
| 9,587,690 B2 * | 3/2017 | Boffelli | F16D 65/847 |
| 9,976,612 B2 | 5/2018 | Tremblay | |
| 10,794,441 B2 | 10/2020 | Kokott et al. | |
| 11,242,902 B2 | 2/2022 | Bozovic et al. | |
| 2008/0164109 A1 | 7/2008 | Guether | |
| 2022/0128108 A1 | 4/2022 | Spray et al. | |

FOREIGN PATENT DOCUMENTS

| | | | |
|---|---|---|---|
| CN | 103030417 A | 4/2013 | |
| CN | 108679121 A | 10/2018 | |
| CN | 209725021 U * | 12/2019 | F16D 65/12 |
| DE | 7831392 U1 | 2/1979 | |
| JP | 2008208869 A | 9/2008 | |

OTHER PUBLICATIONS

Extended Search Report from counterpart European Application No. 24157101.7 dated Jul. 17, 2024, 8 pp.

Notice of Intent to Grant and Text Intended to Grant from counterpart European Application No. 24157101.7 dated Mar. 21, 2025, 115 pp.

Response to Extended Search Report dated Jul. 17, 2024, from counterpart European Application No. 24157101.7 filed Sep. 25, 2024, 12 pp.

* cited by examiner

BRAKE DISC INSERT ASSEMBLY

TECHNICAL FIELD

The present disclosure relates to wheel brake systems of a vehicle.

BACKGROUND

Vehicles, such as aircrafts, may use a wheel brake system that includes a disc stack assembly. For example, the brake system may include a plurality of rotors engaged with a wheel and a plurality of stators interleaved with the rotors. The rotors and wheel are configured to rotate around an axle, while the stators remain rotationally stationary. To decelerate rotational motion of a rotating wheel, the brake system may displace pistons against a pressure plate to squeeze the rotating rotors engaged with the wheel against the stationary stators, therefore producing torque that decelerates the rotational motion of the wheel. In some examples, the rotors may engage with the wheel via rotor drive keys positioned on an interior surface of the wheel. In some such examples, the rotors may define slots configured to receive the rotor drive keys.

SUMMARY

In general, the disclosure describes articles, systems, and techniques relating to an insert assembly for a brake disc in a wheel brake system of a vehicle. The brake disc has one or more disc slots around the brake disc perimeter (e.g., an inner perimeter and/or an outer perimeter), such as a drive slot configured to receive a rotor drive key of the wheel brake system or a spline slot configured to receive a spline of the wheel brake system. The insert assembly is configured to mechanically couple with the brake disc at the disc slot, e.g., such that some portion of the insert resides within the disc slot of the brake disc. The insert assembly may be configured to help protect the brake disc against, for example, the mechanical stresses borne by the disc slot of the brake disc during braking operations of the wheel brake system.

In examples described herein, the insert assembly includes an insert, a rivet, and a washer. The insert is configured to position with the disc slot. The rivet is configured to extend through the washer and a rivet slot of the insert to secure the insert to the brake disc. The insert assembly is configured such that the brake disc imparts a torque to the rotor drive key or spline via the insert during braking operations of the wheel brake system when the insert is secured to the brake disc by the rivet extending through the rivet slot. The rivet slot is configured to allow motion of the insert in a tangential direction of the brake disc when the brake disc imparts the torque to the rotor drive key or spline such that, for example, the insert may seat more firmly against a torque face of the disc when torque is imparted to the rotor drive key or spline via the insert.

The washer is configured to position between a rivet head of the rivet and the insert when the rivet extends through the washer and a rivet slot. In examples, the rivet head is an orbitally riveted head fabricated using an orbital riveting tool. The washer may be configured to allow for the orbital riveting in a manner which limits and/or substantially prevents deformation of the rivet head into the rivet slot. For example, the washer may be configured to substantially separate the forming or formed rivet head from the rivet slot to substantially prevent the rivet from deforming into the rivet slot during an orbital riveting process.

In an example, an assembly comprises: a rivet defining a rivet head attached to a rivet shank; a washer defining a washer hole; and an insert defining an insert ear configured to cover a surface of a brake disc when the insert positions over a torque face of a slot on a perimeter of the brake disc; wherein the insert ear defines a rivet slot extending through the insert ear, wherein the rivet slot is configured to allow passage of the rivet shank through the rivet slot and into the brake disc to secure the insert to the brake disc, wherein the washer is configured to be positioned between the rivet head and the insert ear when the rivet shank passes through the rivet slot and the washer hole and into the brake disc, and wherein the rivet slot is configured to allow motion of the insert relative to the rivet in a tangential direction of the brake disc when the rivet shank passes through the rivet slot and the washer hole and into the brake disc.

In an example, an assembly comprises: a brake disc defining a first surface on a first side of the brake disc, a second surface on a second side of the brake disc opposite the first side, and a torque face between the first surface and the second surface; an insert configured to be positioned over the torque face, wherein the insert defines a first insert ear configured to cover the first surface and a second insert ear configured to cover the second surface when the insert positions over the torque face, wherein the first insert ear defines a first rivet slot extending through the first insert ear in an axial direction of the brake disc, and wherein the second insert ear defines a second rivet slot extending through the second insert ear in the axial direction of the brake disc; a first washer defining a first washer hole; a second washer defining a second washer hole; and a rivet defining a first rivet head attached to a first end portion of a rivet shank and defining a second rivet head attached to a second end portion of the rivet shank opposite the first end, wherein the rivet shank is configured to pass through the first washer hole, the first rivet slot, the brake disc, the second washer hole, and the second rivet slot, such that the first washer is between the first rivet head and the first insert ear and the second washer is between the second rivet head and the second insert ear, and wherein the first rivet slot and the second rivet slot are configured to allow motion of the insert relative to the rivet in a tangential direction of the brake disc when the rivet shank is passed through the first washer hole, the first rivet slot, the brake disc, the second washer hole, and the second rivet slot.

In an example, a method comprises: covering a torque face defining a slot of a brake disc and a surface of the brake disc with an insert, wherein the insert defines an insert ear covering the surface; and extending a rivet shank of a rivet through a washer hole of a washer, through a rivet slot of the insert ear, and into the brake disc to secure the insert to the brake disc as the insert covers the torque face and the surface of the brake disc, such that the washer is between a rivet head of the rivet and the insert ear, wherein the rivet slot is configured to allow motion of the insert relative to the rivet in a tangential direction of the brake disc when the rivet shank passes through the rivet slot and the washer hole and into the brake disc.

The details of one or more examples are set forth in the accompanying drawings and the description below. Other features, objects, and advantages will be apparent from the description and drawings, and from the claims.

DETAILED DESCRIPTION

Figure 1:
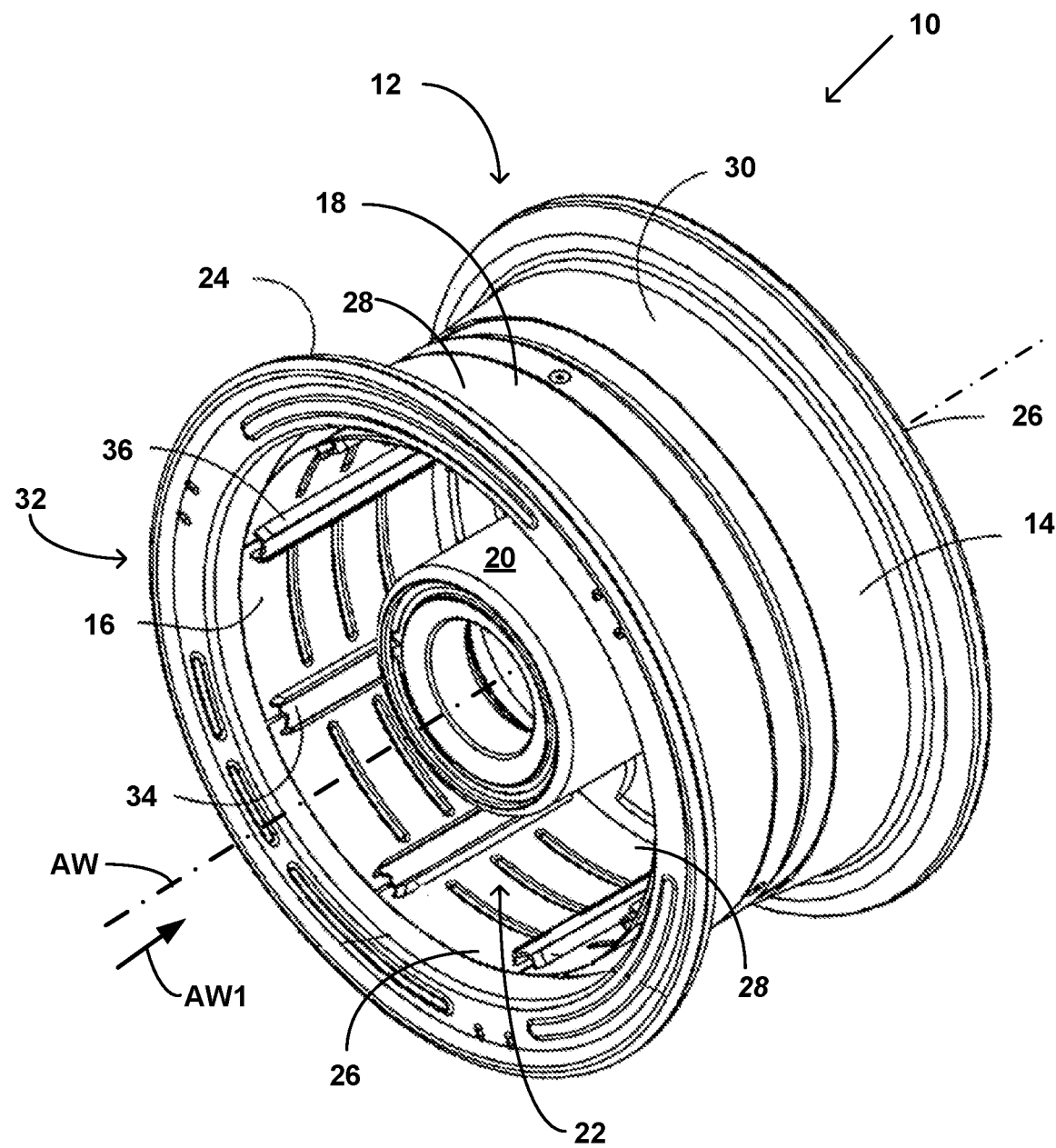
FIG. 1 is a perspective view illustrating an example wheel including a plurality of rotor drive keys on an interior surface of the wheel.

The disclosure describes articles, systems, and techniques relating to an insert for a brake disc in a wheel brake system of a vehicle. The insert described herein is configured to be mechanically coupled to a brake disc, which may be one of a plurality of brake discs of a brake disc stack of a brake system. The brake disc defines a plurality of disc slots (e.g., a plurality of drive slots and/or a plurality of spline slots) around a brake disc perimeter, and the insert is configured to mechanically couple with the brake disc at the disc slot. For example, the brake disc may include a plurality of drive slots on an outer perimeter of the brake disc, and the insert may be configured to mechanically couple with the brake disc at a drive slot. As another example, the brake disc may include a plurality of spline slots on an inner perimeter of the brake disc, and the insert may be configured to mechanically couple with the brake disc at a spline slot.

The insert is configured such that at least some portion of the insert resides between the disc slot of the brake disc and a rotor drive key or spline extending through the slot when the brake disc is assembled within a brake system. The insert may be configured to protect the brake disc against, for example, the mechanical stresses borne by the disc slot of the brake disc during braking operations of a brake system. For example, the insert may be configured to help distribute the load from the drive key and/or splines to the brake disc and/or to reduce wear on the brake disc.

The insert is configured to mechanically couple to the brake disc in a manner that allows motion of the insert relative to the brake disc in a tangential direction of the brake disc during braking operations of a brake system. For example, the brake disc may be a rotor disc or a stator disc within a disc stack of the braking system. During a braking operation, the disc stack may be compressed, for example by one or more piston and cylinder assemblies, in order to urge the friction surfaces of the disc stack into engagement. The frictional engagement may impart torque via the insert to a rotor drive key extending through a drive slot or spline extending through a spline slot. The insert is configured to mechanically couple to the brake disc to allow tangential motion of the insert relative to the brake disc when the torque is imparted to the rotor drive key or spline via the insert such that, for example, the insert may seat more firmly against a torque face of the disc when torque is imparted to the rotor drive key or spline via the insert.

Disclosed herein is an assembly including an insert, a rivet, and a washer configured to position on a brake disc. The rivet includes a rivet head attached to an end portion of a rivet shank. The insert is configured to position within a disc slot of the brake disc (e.g., a drive slot or a spline slot). The rivet shank is configured to extend through a washer hole of the washer and a rivet slot of the insert to secure the insert to the brake disc. In examples, the rivet extends into the brake disc in an axial direction of the brake disc. The rivet head and/or the rivet slot are configured to position (e.g., seat or trap) the washer between the insert and the rivet head when the rivet shank extends into the brake disc. The rivet slot is configured to allow for the motion of the insert relative to the brake disc and/or the rivet in the tangential direction when torque is imparted through the disc slot via the insert. The assembly is configured such that, when the rivet slot allows tangential motion of the insert, the insert moves relative to the rivet and the washer. In examples, a first side of the insert is slidably engaged with the washer and a second side of the insert opposite the first side is slidably engaged with a surface of the brake disc such that, during tangential motion of the insert, the insert slides between the washer and the brake disc relative to both the washer and the brake disc.

The insert is configured to cover a surface of the brake disc when the insert is positioned within a disc slot. For example, the insert may define an insert ear configured to cover the surface of the brake disc when the insert is positioned within a disc slot. In examples, the insert ear is configured to provide axial support to the insert when the insert is positioned within the disc slot. For example, the insert ear may be configured to engage the disc surface when the insert experiences a force acting in a direction from the insert ear towards the brake disc (e.g., a force in an axial direction of the brake disc). In examples, the insert ear defines the rivet slot.

In examples, the rivet head is an orbitally riveted head fabricated using an orbital riveting tool (e.g., a peen tool). In some examples, the washer is configured to allow for the orbital riveting (and/or another cold forming process) of the rivet head in a manner which limits and/or substantially prevents deformation of the rivet head into the rivet slot during the orbital riveting process. The insert may be positioned within the disc slot, and the rivet shank extended through the washer hole, the rivet slot of the insert, and into the brake disc, prior to fabricating the rivet head at the end of the rivet shank. The rivet head may be fabricated by deforming a portion of the rivet (e.g., an end of the rivet shank) to cause the portion of the rivet to substantially collapse against the washer. The washer may substantially separate the forming or formed rivet head from the rivet slot, limiting and/or substantially preventing the rivet from deforming into the rivet slot. Hence, the washer may reduce and/or limit physical interference between the rivet head and the rivet slot which might otherwise limit and/or substantially prevent motion of the insert relative to the brake disc. Further, the boundary of the washer hole may radially support a portion of the rivet shank immediately adjacent the forming or formed rivet head, limiting and/or substantially preventing expansion of the rivet shank within the insert slot during the orbital riveting process to, for example, reduce and/or limit physical interference between a deformed rivet shank and the rivet slot that might otherwise limit and/or substantially prevent motion of the insert relative to the brake disc. In examples, the rivet is a solid rivet having a substantially solid rivet shank (rather than, e.g., a hollow rivet or semi-tubular rivet), such that the rivet may be considered a solid rivet.

In examples, the rivet slot is a substantially oblong and/or oval shaped slot configured to allow the tangential motion of the insert. For example, the rivet slot may define a first dimension (e.g., first dimension D1 (FIG. 7)) in tangential direction of the brake disc and a second dimension (e.g., second dimension D2 (FIG. 7)) in a radial direction of the brake disc (or otherwise orthogonal to the first dimension). The first dimension D1 may be configured to allow tangential motion of the insert relative to the rivet and brake disc when the rivet shank extends through the rivet slot and into the brake disc. The first dimension D1 may exceed a cross-sectional dimension of the rivet shank (e.g., a diameter), such that the insert may move relative to the rivet. For example, the first dimension D1 may exceed the cross-sectional dimension of the rivet shank by about 5%, 10%, 25%, 50%, 100%, or another percentage of the cross-sectional dimension of the rivet shank. The second dimension D2 may be less than the first dimension. For example, the rivet slot may be configured such that the second dimension D2 is slightly larger than the cross-sectional dimension of the rivet shank (e.g., by about 1%, 5,%, 10%, or another percentage of the cross-sectional dimension of the rivet shank) while remaining less than the first dimension D1.

In some examples, the rivet slot is configured to allow the insert to pivot around the rivet shank to at least some degree when torque is imparted by the disk slot to a rotor drive key or spline via the insert. Pivoting of the insert around the rivet shank may allow the insert to seat more firmly and conform more effectively against the disc when the torque is imparted. This may allow the insert to distribute forces (e.g., reaction forces imparted to the disc from a rotor drive key or spline) more effectively over a torque face of the brake disc, reducing stresses generated on the brake disc during a braking operation. As used herein, when the rivet slot is configured to allow the insert to pivot around the rivet shank, this may mean rivet slot is configured such that the insert may rotate to some degree with respect to the brake disc when the rivet shank extends through the rivet slot and into the brake disc. For example, the insert may rotate with respect to the brake disc around a rotation axis parallel to the axial direction of the brake disc, such that the rotation defines an angle of rotation in a plane defined by the tangential direction of the brake disc and the radial direction of the brake disc.

In examples, the rivet slot is configured to allow for tangential motion of the insert relative to the rivet and the brake disc in a manner reducing and/or substantially limiting loading (e.g., shear loading) of the rivet shank. For example, the insert may include a body section comprising a drive face configured to engage a rotor drive key or spline when the brake disc imparts a torque to the rotor drive key or spline. The body section may include a back face opposite the drive face configured to engage the brake disc (e.g., a torque face defining the disc slot) when the brake disc imparts the torque, such that the brake disc imparts the torque via the insert. The insert (e.g., the rivet slot) may be configured such that the back face engages the brake disc without the rivet shank engaging the rivet slot when the insert moves tangentially, such that the rivet slot is substantially prevented from imparting a force (e.g., a shear force) against the rivet shank as the brake disc imparts the torque via the insert. This may reduce and/or substantially eliminate shear forces imparted to the rivet, such that the rivet (e.g., the rivet shank) remains substantially unloaded by the impartation of torque from the brake disc to the rotor drive key or spline.

For example (e.g., when the insert is secured to the brake disc by the rivet), the insert is configured to translate a first distance (e.g., first distance DS1 (FIG. 8)) to cause the back face to engage the brake disc, and the rivet slot is configured such that the rivet shank is separated from a portion of the boundary of the rivet slot by a second distance (e.g., second distance DS2 (FIG. 8)) greater than the first distance. In some examples (e.g., when the insert is secured to the brake disc by the rivet), the insert is configured such that the rivet is separated by a third distance in the tangential direction of the brake disc (e.g., third distance DS3 (FIG. 9)) when the back face engages the brake disc.

In examples, the insert defines a gap configured to receive the brake disc when the insert positions within the disc slot and covers the torque face of the disc slot. The insert may be configured such that the brake disc constrains displacement of the insert in the axial direction of the brake disc when the insert receives the brake disc. For example, a brake disc may include a first side and a second side displaced from the first side in an axial direction of the brake disc. The first and second sides may include, for example, friction surfaces of the brake disc configured to engage a friction surface of an adjacent brake disc during a braking operation. The disc slot (e.g., a drive slot on an outer perimeter or a spline slot on an inner perimeter) may extend in the axial direction substantially between the first side and the second side.

The insert (e.g., an insert ear) may be configured to cover a first surface on the first side and cover a second surface on the second side when the insert receives the brake disc. In some examples, the insert slidably engages the first surface and the second surface, such that the insert can substantially slide over the first surface and the second surface when the insert moves in the tangential direction of the brake disc. The insert may be configured such that the first surface and/or second surface engages the insert when the insert experiences a force in an axial direction of the brake disc, such that the brake disc substantially abuts the insert when the insert receives the brake disc, such that the brake disc constrains displacement of the insert in the axial direction of the brake disc.

Figure 7:
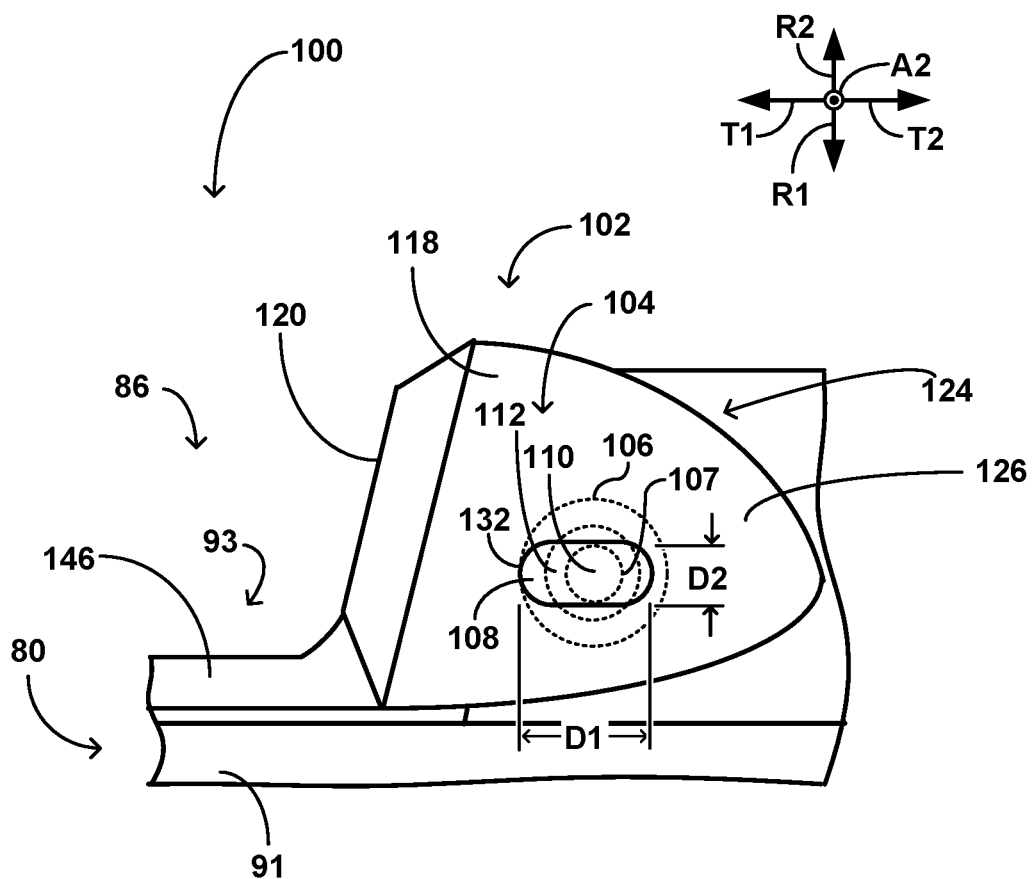
FIG. 7 is a schematic view of a portion of the insert of FIG. 4 positioned on the brake disc.

The insert may be configured such that the rivet substantially constrains displacement of the insert in a radial direction of the brake disc when the rivet extends through the rivet slot and into the brake disc. The insert may be configured such that the rivet encounters the rivet slot when the insert experiences a force in a radial direction of the brake disc, such that the rivet and/or rivet slot constrains displacement of the insert in the radial direction of the brake disc. For example, the insert may be configured such that the rivet slot limits displacement of the insert in the radial direction to a distance of about the second dimension D2 (FIG. 7).

As used herein, an axial direction of a brake disc means a direction substantially parallel (e.g., parallel or nearly parallel to the extent permitted by manufacturing tolerances) to a disc axis A (FIG. 3) about which the brake disc is configured to rotate. A radial direction of the brake disc means a direction substantially parallel (e.g., parallel or nearly parallel to the extent permitted by manufacturing tolerances) to a radial distance in a cylindrical coordinate system when the disc axis A is the cylindrical axis in the cylindrical coordinate system. A tangential direction of the brake disc means a direction perpendicular to the axial direction and perpendicular to the radial direction.

Hence, the assembly described herein includes an insert is configured to mechanically couple to the brake disc in a manner that allows motion of the insert relative to the brake disc (and/or a rivet) in a tangential direction of the brake disc during braking operations of a brake system such that, for example, the insert may seat more firmly against a torque face of the disc when torque is imparted to the rotor drive key or spline via the insert. A rivet shank is configured extend through a washer hole of a washer and a rivet slot of the insert to secure the insert to the brake disc. In some examples, the rivet slot is a substantially elongated (e.g., oblong and/or oval shaped) slot configured to allow the tangential motion of the insert. The assembly may be configured such that, when the rivet slot allows tangential motion of the insert, the insert moves relative to the rivet and the washer. In examples, the washer is configured to allow for a cold forming process (e.g., orbital riveting) of a rivet head on the rivet shank in a manner which limits and/or substantially prevents deformation of the rivet head into the rivet slot during the orbital riveting process.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around an axis of rotation AW. An axial direction AW1 of wheel 10 is parallel to the axis of rotation AW.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in the axial direction AW1 of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation AW, each of the rotor drive keys (e.g., rotor drive keys 34, 36) translates over a closed path around axis AW. Consequently, when wheel 10, interior surface 16, and rotor drive keys 32 are rotating around axis of rotation AW, a force on one or more of rotor drive keys 32 opposing the direction of rotation acts to slow or cease the rotation. Rotor drive keys 32 may be configured to receive a torque from a brake system (e.g., brake system 40 (FIG. 2)) configured to reduce and/or cease a rotation of wheel 10. Rotor drive keys 32 may be integrally formed with interior surface 16, or may be separate from and mechanically affixed to interior surface 16.

Figure 2:
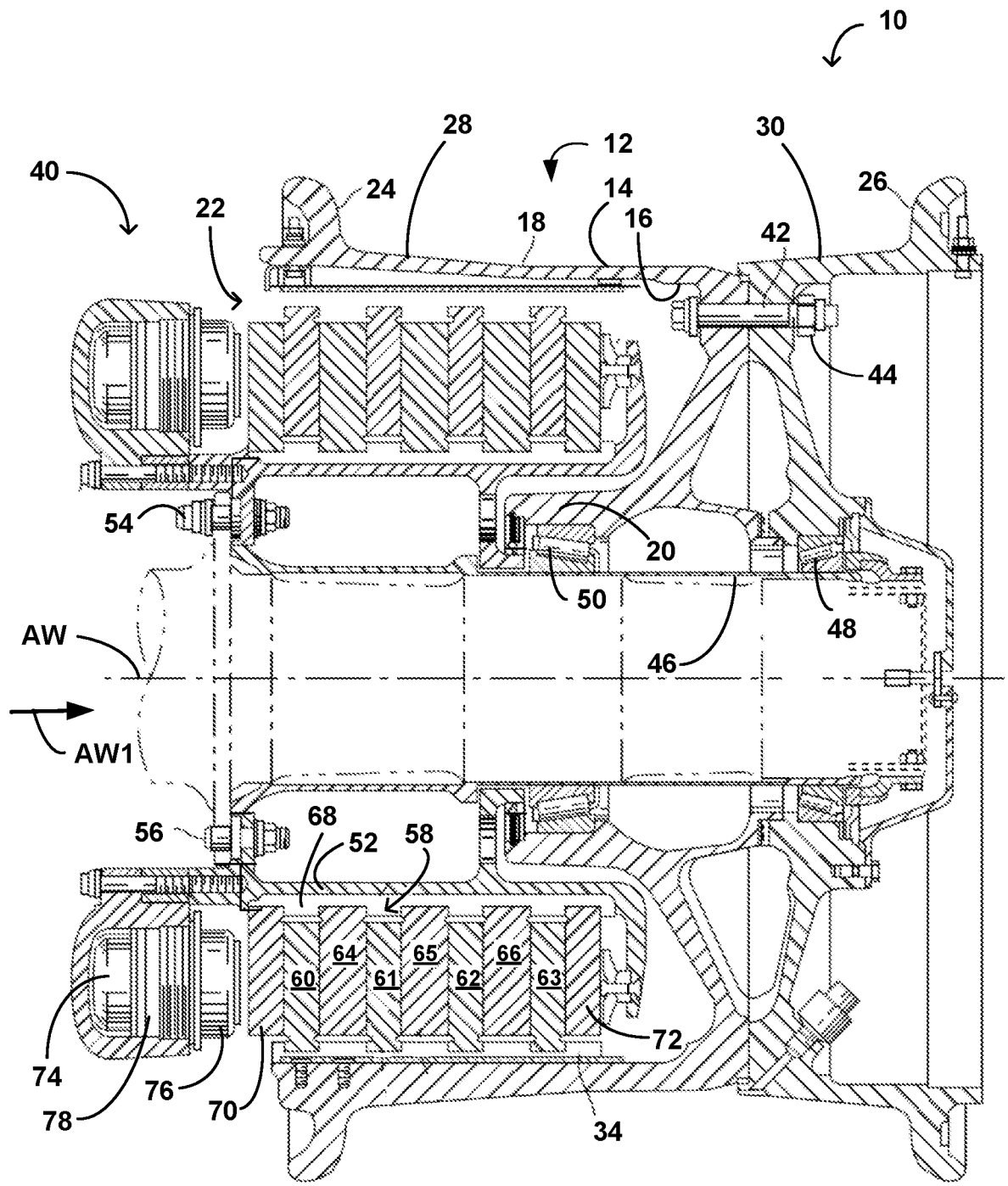
FIG. 2 is a schematic cross-sectional view of an example wheel and brake system including the wheel of FIG. 1, with a cutting plane taken parallel to an axis of rotation of one or more rotor discs of the brake system.

FIG. 2 is a schematic cross-sectional view illustrating wheel 10 and an example brake system 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples. Wheel 10 and brake system 40 is shown and described to provide context to the example inserts described here. The inserts described herein, however, may be used with any suitable wheel and brake system in other examples.

Wheel 10 is configured to rotate about axis AW extending through an axial assembly 46. Axial assembly 46 is figured to support wheel 10 while allowing wheel 10 to rotate around axis A using bearing 48 and bearing 50. For example, bearings 48, 50 may define a substantially circular track around axial assembly 46. A torque tube 52 is coupled to axial assembly 46 (e.g., via bolts 54, 56), such that torque tube 52 remains substantially stationary when wheel 10 rotates around axial assembly 46 and axis A. Torque tube 52 may at least partially surround an exterior of axial assembly 46. Axial assembly 46 may be mechanically coupled to a structure (e.g., a strut) attached to a vehicle.

In the example shown in FIG. 2, brake system 40 is positioned within wheel 10 and is configured to engage torque tube 52 and rotor drive key 34. Brake system 40 is configured to generate a torque to oppose a rotation of wheel 10 around axis AW and transfer the torque to rotor drive key 34, reducing and/or eliminating the rotation of wheel 10 around axis AW. Brake system 40 includes a disc stack 58 which includes one or more brake discs, such as one or more rotor discs (e.g., rotor discs 60, 61, 62, 63) and/or one or more stator discs (e.g., stator discs 64, 65, 66). Rotor discs 60, 61, 62, 63, and/or stator discs 64, 65, 66, may have any suitable configuration. For example, rotor discs 60, 61, 62, 63 and/or stator discs 64, 65, 66 can each be substantially annular discs surrounding axial assembly 46. Stator discs 64, 65, 66 are coupled to torque tube 52 via spline 68 and remain rotationally stationary with respect to torque tube 52 (and axial assembly 46) as wheel 10 rotates.

Rotor discs 60, 61, 62, 63 are rotationally coupled to rotor drive key 34 and interior surface 16 and rotate substantially synchronously with wheel 10 around axis A. For example, rotor drive key 34 may be configured to extend through a drive slot on a perimeter (e.g., an outer perimeter) of one or more of rotor discs 60, 61, 62, 63 to cause rotor discs 60, 61, 62, 63 to rotate substantially synchronously with wheel 10. Spline 68 may be configured to extend through a spline slot on a perimeter (e.g., an inner perimeter) of one or more of stator discs 64, 65, 66 to cause stator discs 64, 65, 66 remain rotationally stationary with respect to torque tube 52 (and axial assembly 46) as wheel 10 rotates. Disc stack 58 may include any number of rotor discs and stator discs.

Rotor discs 60, 61, 62, 63, and/or stator discs 64, 65, 66, may be configured to provide opposing friction surfaces for braking a vehicle, such as an aircraft. Compression of disc stack 58 (e.g., between pressure plate 70 and backing plate 72) may bring the opposing friction surfaces into contact, generating shearing forces between the rotor discs rotating substantially synchronously with wheel 10 and the stator discs remaining substantially stationary with respect to torque tube 52. The shearing forces may cause a rotor disc (e.g., rotor discs 60, 61, 62, 63) engaged with rotor drive key 34 to impart a torque on rotor drive key 34 opposing the rotation of wheel 10. The rotor disc may impart the opposing torque to rotor drive key 34 using the drive slot through which rotor drive key 34 extends. The shearing forces may cause a stator disc (e.g., stator discs 64, 65, 66) engaged with spline 68 to impart a torque on spline 68 to counteract the torque imposed on rotor drive key 34. The stator disc may impart the torque to spline 68 using the spline slot through which spline 68 extends.

In examples, a brake disc of disc stack 58 includes an insert positioned within a disc slot (e.g., a rotor drive slot or a spline slot). The insert may be configured such that some portion of the insert resides within the disc slot of the brake disc and is positioned between the disc slot and the brake disc. The insert may be configured to allow the brake disc to translate in a direction substantially parallel to axis AW when disc stack 58 is compressed. The insert may be configured to help protect the brake disc against, for example, the mechanical stresses borne by the disc slot of the brake disc when disc stack 58 is compressed and rotor discs 60, 61, 62, 63 impart a torque to rotor drive key 34 and/or stator discs 64, 65, 66 impart a torque to spline 68. In examples, the insert is configured to allow for movement of the insert in a tangential direction of the brake disc when the brake disc imparts a torque to rotor drive key 34 or spline 68 such that, for example, the insert may seat more firmly against a torque face of the disc when torque is imparted to the rotor drive key or spline via the insert.

An actuator 74 is configured to compress disc stack 58 to bring the opposing friction surfaces of rotor discs 60, 61, 62, 63 into contact with friction surfaces of stator discs 64, 65, 66. Actuator 74 may be configured to cause a piston 76 to translate relative to a body 78 of actuator 74 to compress disc stack 58. Actuator 74 may cause piston 76 to translate using any suitable method. In some examples, actuator 74 is configured to cause translation of piston 76 by supplying and/or venting a pressurized hydraulic fluid to or from a piston chamber. In addition or instead, in some examples, actuator 74 is configured to cause piston 76 to translate through a motion (e.g., a rotary motion) generated by an electric motor.

Wheel 10 may be used with any variety of private, commercial, or military aircraft or other type of vehicle. Wheel 10 may be mounted to a vehicle via, for example, axial assembly 46, or some other appropriate arrangement to allow wheel 10 to rotate around axis AW. Axial assembly 46 may be mounted on a strut of a landing gear (not shown) or other suitable component of a vehicle to connect wheel 10 to the vehicle. Wheel 10 may rotate around axis A and axial assembly 46 to impart motion to the vehicle. Wheel 10 is shown and described to provide context to the brake system described herein, however the brake system described herein may be used with any suitable wheel assembly in other examples.

Figure 3:
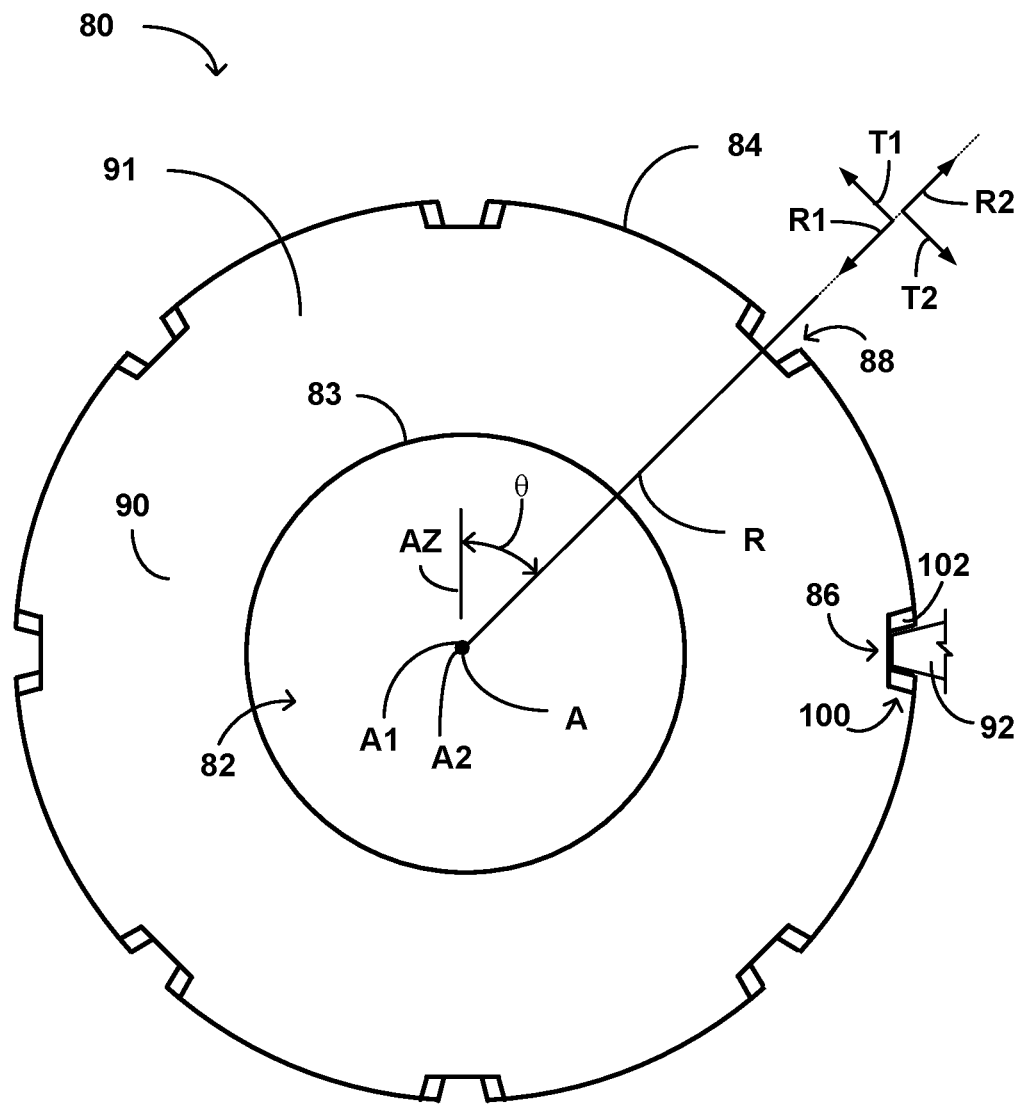
FIG. 3 is a plan view illustrating an example brake disc defining a plurality of drive slots.

FIG. 3 is a diagram illustrating an example brake disc 80, which is an example of one or more brake discs within disc stack 58 (FIG. 2). For example, brake disc 80 may be an example of one or more of rotor discs 60, 61, 62, 63 (FIG. 2). Brake disc 80 defines a central aperture 82 extending through brake disc 80. Central aperture 82 may be defined by an inner perimeter 83 of disc 80 ("disc inner perimeter 83"). Central aperture 82 is configured to allow rotation of brake disc 80 around an axis A illustrated perpendicular to the page. Brake disc 80 further defines a plurality of drive slots around an outer perimeter 84 of brake disc 80 ("disc outer perimeter 84"). The plurality of drive slots comprises, for example, disc slot 86 and disc slot 88, as well as others similarly depicted. Brake disc 80 further includes friction surface 90 on a first side 91 of brake disc 80 ("disc first side 91"), and may include a second friction surface (not shown) on a second side 93 of brake disc 80 ("disc second side 93") opposite disc first side 91. Although depicted as a drive slot in FIG. 3 for reference, disc slot 86 may be, for example, a drive slot defined on disc outer perimeter 84, or a spline slot defined on disc inner perimeter 83.

Brake disc 80 is configured to rotate substantially around axis A. A first axial direction A1 of brake disc 80 is a first vector coincident with axis A and having a direction perpendicular to and into the page. A second axial direction A2 of brake disc 80 is a second vector coincident with axis A and having a direction perpendicular to and out of the page. A radial axis R intersects and is perpendicular to the axis A. First radial direction R1 of brake disc 80 is a third vector coincident with radial axis R and having a direction toward axis A. Second radial direction R2 is a fourth vector having a direction opposite the third vector. A first tangential direction T1 of brake disc 80 is a fifth vector defining a 90 degree angle from first radial direction R1 and first axial direction A1 in a right-handed coordinate frame. A second tangential direction T2 is a sixth vector having a direction opposite the third vector.

In FIG. 3, the radial direction R is illustrated as defining an angle θ with a reference axis AZ. The radial direction R may be oriented with respect to brake disc 80 to define any angle θ with reference axis AZ. For example, a specific radial direction R may define an angle θ causing the radial direction R to intersect disc slot 88, disc slot 86, any other disc slot on brake disc 80, any point on disc outer perimeter 84, or any point on brake disc 80. The inward radial direction R1, the outward radial direction R2, the first tangential direction T1, and the second tangential direction T2 may be defined with respect to the specific radial direction R. In some examples, axis A is substantially parallel to axis AW of wheel 10 (e.g., parallel or nearly parallel to the extent permitted by manufacturing tolerances).

As used herein, the first axial direction A1, the first radial direction R1, the first tangential direction T1, the second axial direction A2, the second radial direction R2, and/or the second tangential direction T2, may refer to directions relative to a fixed point on brake disc 80 and defined by the orientation of brake disc 80. In some examples, the first axial direction A1, the first radial direction R1, the first tangential direction T1, the second axial direction A2, the second radial direction R2, and/or the second tangential direction T2, refer to directions relative to a fixed point on an insert assembly and defined by an orientation of the insert assembly, with the directions relative to the fixed point on the insert assembly corresponding to the directions of the first axial direction A1, the first radial direction R1, the first tangential direction T1, the second axial direction A2, the second radial direction R2, and/or the second tangential direction T2 which would result if the insert assembly were secured to brake disc 80. For example, when an insert assembly is displaced from (e.g., not secured to) brake disc 80, the first axial direction A1, the first radial direction R1, the first tangential direction T1, the second axial direction A2, the second radial direction R2, and/or the second tangential direction T2, may refer to directions relative to the orientation of the insert assembly that would result were the insert assembly to be secured to brake disc 80.

The plurality of disc slots such as 86, 88 may be to accommodate the extension of a plurality of drive keys, such as the plurality of rotor drive keys 32 (FIG. 1), through disc slots 86, 88. For example, FIG. 3 illustrates a portion of a rotor drive key 92 extending through disc slot 86. Rotor drive key 92 may be a rotor drive key within the plurality of rotor drive keys 32 (FIG. 1), such as rotor drive key 34 (FIG. 2). Disc slot 86 may be configured such that rotor drive key 92 extends through disc slot 86 in an axial direction of brake disc 80 (e.g., a direction substantially parallel to axis A, e.g., parallel or nearly parallel to the extent permitted by manufacturing tolerances). One or more of the drive slots (e.g., a subset of the drive slots or all of the drive slots) defined by brake disc 80 may have a portion of a respective rotor drive key extending through the drive slot in a manner similar to that depicted for disc slot 86 and rotor drive key 92.

Rotor drive key 92 is configured such that, when rotor drive key 92 rotates synchronously with a wheel (e.g., wheel 10 (FIGS. 1 and 2), rotor drive key imparts a force on brake disc 80 in a tangential direction of brake disc 80 (e.g., in first tangential direction T1 or second tangential direction T2) to cause rotation of brake disc 80 around axis A. Brake disc 80 is configured such that, when a shearing force generates on friction surface 90 (e.g., due to frictional engagement with a stator disc), disc slot 86 imparts a force on rotor drive key 92 (e.g., in first tangential direction T1 or second tangential direction T2) which opposes the synchronous rotation of rotor drive key 92 with wheel 10.

In some examples, e.g., when disc slots 86, 88 are defined on disc inner perimeter 83 of brake disc 80, disc slots 86, 88 may be configured to accommodate the extension of one or more splines, such as one or more of spline 68 (FIG. 2). For example, disc slots 86, 88 may be configured such that spline 68 extends through disc slot 86 in an axial direction of brake disc 80. Brake disc 80 may be configured such that, when a shearing force generates on friction surface 90 (e.g., due to frictional engagement with a rotating rotor disc), disc slot 86 imparts a force on spline 68 (e.g., in first tangential direction T1 or second tangential direction T2).

One or more (e.g., all) of the plurality of drive slots defined by brake disc 80, including disc slots 86, 88, may be reinforced by an insert assembly, such as insert assembly 100 including insert 102 within disc slot 86. While insert assembly 100 and disc slot 86 are primarily referred to in the description of FIG. 3 as well as other figures, the description of insert assembly 100 and disc slot 86 may apply to the other disc slots and drive inserts of brake disc 80 and other brake discs described herein. Additionally, while brake disc 80 is primarily referred to in the description of FIG. 3 as well as other figures, the insert assemblies described herein may also be utilized on a stator slot of a stator brake disc, such as one or more of stator brake discs 64, 65, 66 (FIG. 2). For example, the insert assemblies described herein be utilized on a stator slot of an inner perimeter of a brake disc (e.g., stator discs 64, 65, 66) similar to disc inner perimeter 83.

Insert assembly 100 is configured to minimize or even eliminate the extent to which rotor drive key 92 engages directly with a surface of brake disc 80 during a braking operation. Insert assembly 100 (e.g., insert 102) may be configured to provide a sliding and a bearing surface to act against rotor drive key 92 during braking operations, such that insert assembly 100 minimizes or even eliminates the engagement. Insert assembly 100 is configured to allow for movement of insert 102 in a tangential direction of the brake disc (e.g., in the first tangential direction T1 and/or the second tangential direction T2) when brake disc 80 imparts a torque to rotor drive key 92, or when brake disc 80 imparts a torque to a spline (e.g., spline 68 (FIG. 2)). Insert assembly 100 may be configured to help protect brake disc 80 against, for example, the mechanical stresses borne by disc slot 86 of brake disc 80 when brake disc 80 imparts a torque to rotor drive key 92 or spline 68.

Figure 4:
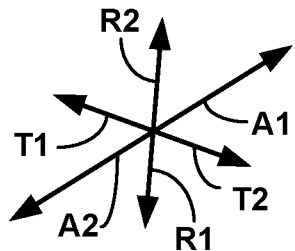
FIG. 4 is an exploded view of an example insert assembly and a portion of an example brake disc.
Figure 4:
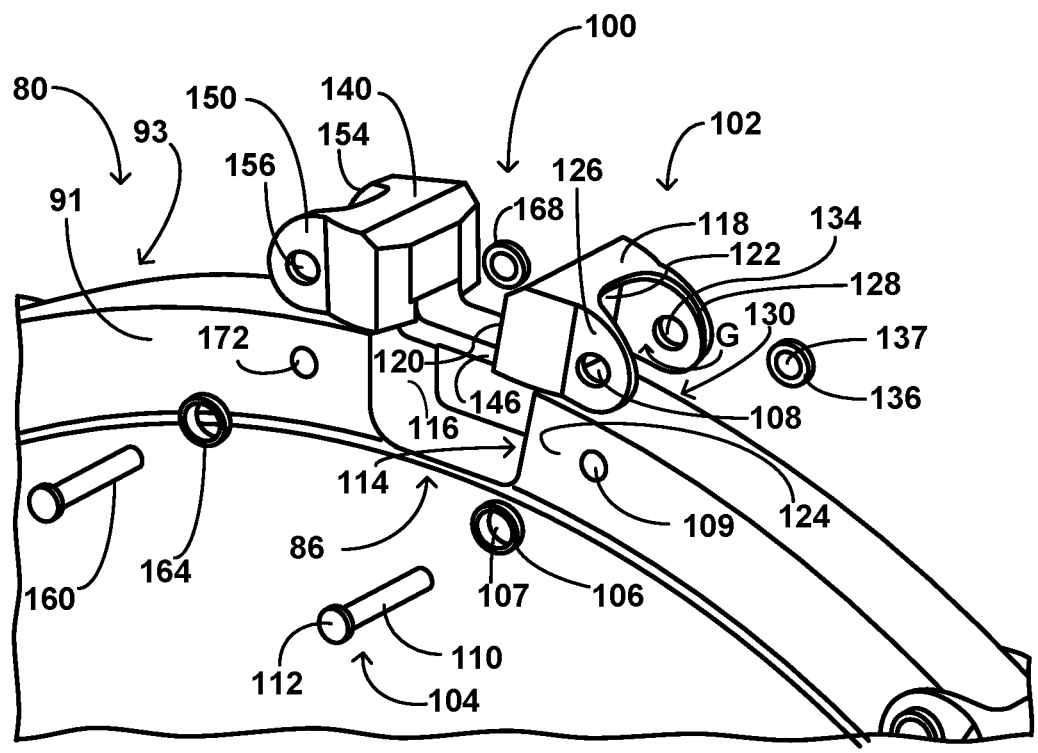
Figure 5:
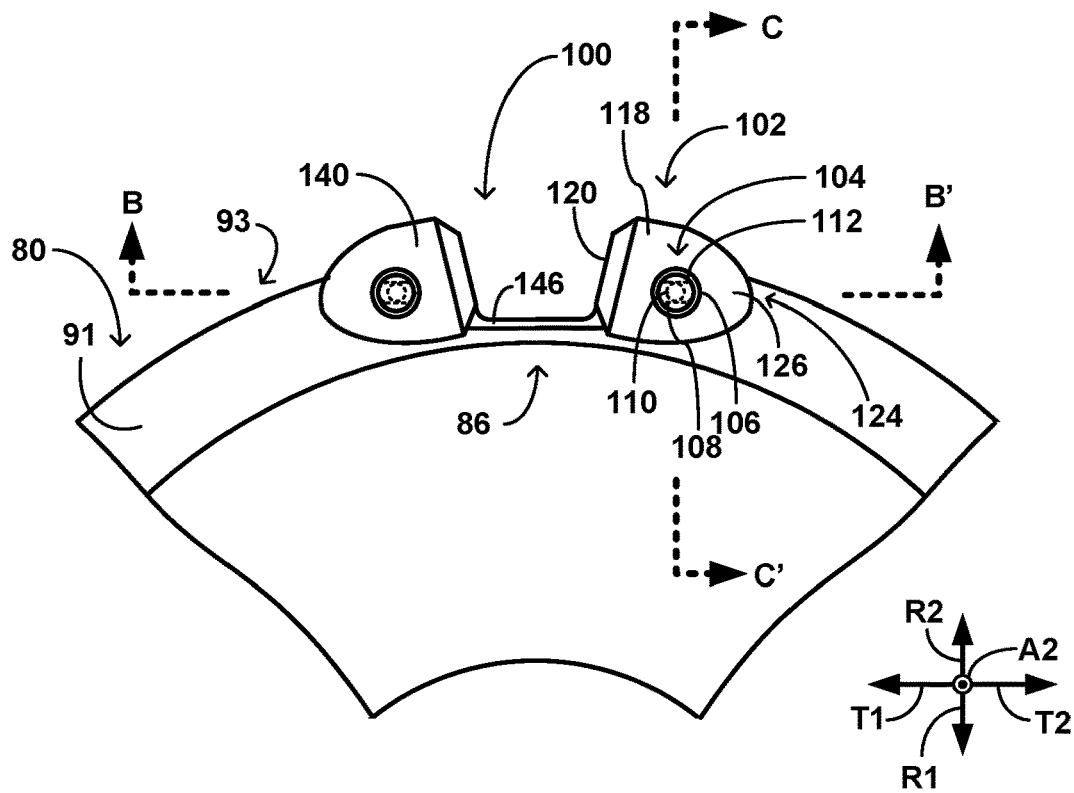
FIG. 5 is a schematic plan view of the insert of FIG. 4 positioned on the brake disc.
Figure 6:
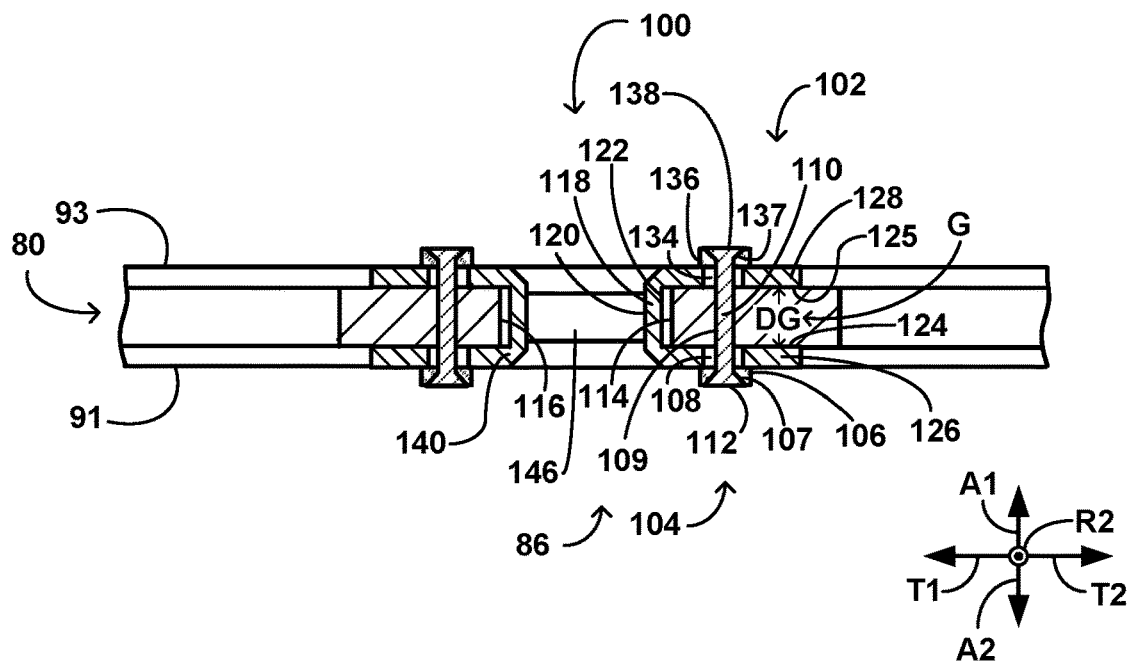
FIG. 6 is a cross-sectional top view of the insert of FIG. 4 positioned on the brake disc, with a cutting plane parallel to an axial direction of a brake disc.

FIGS. 4-6 illustrate an example insert assembly 100 comprising an insert 102, a rivet 104, and a washer 106. Insert assembly 100 is configured to position within a disc slot 86 of brake disc 80. FIG. 4 is an exploded view, showing insert 102, rivet 104, and washer 106 displaced from brake disc 80, with a first axial direction A1 parallel to axis A (FIG. 3) and a second axial direction A2 parallel to axis A and opposite first axial direction A1 illustrated for reference, along with first radial direction R1, second radial direction R2, first tangential direction T1, and second tangential direction T2. FIG. 5 is a schematic plan view of insert assembly 100 positioned within disc slot 86, with second axial direction A2 perpendicular to and proceeding out of the page, first axial direction A1 (not shown) perpendicular to and proceeding in to the page, and first radial direction R1, second radial direction R2, first tangential direction T1, and second tangential direction T2 parallel to the page. FIG. 6 is a cross-sectional top view of insert assembly 100 positioned within disc slot 86, with the cross-section taken over the cutting plane illustrated as B-B' in FIG. 5. In FIG. 6, second radial direction R2 is perpendicular to and proceeds out of the page, first radial direction R1 (not shown) is perpendicular to and proceeds in to the page, and first axial direction A1, second axial direction A2, first tangential direction T1, and second tangential direction T2 are parallel to the page.

Insert 102 is configured to position within disc slot 86 such that at least some portion of insert 102 resides between disc slot 86 and a rotor drive key or a spline when the rotor drive key or the spline extends through disc slot 86 in an axial direction A (FIG. 3) of brake disc 80. In examples, disc slot 86 is bounded at least in part by a first torque face 114 and a second torque face 116 facing first torque face 114. Insert 102 is configured to reside between first torque face 114 and/or second torque face 116 when insert 102 is received within disc slot 86. In some examples, insert 102 is configured such that brake disc 80 imparts a torque to a rotor drive key or spline via insert 102 when insert 102 is positioned within disc slot 86. For example, insert 102 may include a body section 118 defining a drive face 120 and a back face 122 opposite the drive face 120. In examples, at least some portion of body section 118 separates drive face 120 and back face 122. Drive face 120 may be configured to engage a rotor drive key or spline when insert 102 is positioned in disc slot 86 and brake disc 80 imparts a torque to the rotor drive key or spline. Back face 122 may be configured to engage first torque face 114 when brake disc 80 imparts the torque to the rotor drive key or spline, such that the brake disc 80 imparts the torque to the rotor drive key or spline via insert 102.

First torque face 114 and/or second torque face 116 may define some portion of disc slot 86. First torque face 114 and/or second torque face 116 may be configured to bear a tangential force (e.g., in the first tangential direction T1 or in the second tangential direction T2) imparted by a rotor drive key or spline during a braking operation. First torque face 114 and/or second torque face 116 may have any suitable orientation relative to the axial directions A1, A2, the radial directions R1, R2, and/or the tangential directions T1, T2. In some examples, first torque face 114 and/or second torque face 116 slants with respect to at least the first radial direction R1, such that a vector parallel to first torque face 114 or second torque face 116 defines a slope $\Delta R1/\Delta T1$, where $\Delta R1$ is the absolute value of a displacement in the first radial direction R1 and ΔT1 is the absolute value of a displacement in a direction parallel to the first tangential direction T1. In examples, first torque face 114 and/or second torque face 116 are non-parallel (e.g., slanted with respect to) a plane defined by the axial directions A1, A2 and the radial directions R1, R2 (non-parallel manufacturing (e.g., non-parallel or nearly non-parallel to the extent permitted by manufacturing tolerances).

Insert 102 is configured to cover a first surface 124 of brake disc 80 ("first disc surface 124") when insert 102 is positioned within disc slot 86. In examples, first disc surface 124 is a portion of disc first side 91. Insert 102 may define an insert ear 126 configured to cover first disc surface 124 when insert 102 is positioned within disc slot 86. In examples, insert ear 126 is configured to provide axial support to insert 102 when insert 102 is positioned within disc slot 86. For example, insert ear 126 may be configured to engage (or remain engaged with) first disc surface 124 when insert 102 experiences a force acting in a direction from insert ear 126 towards brake disc 80 (e.g., a force in the first axial direction A1). Insert ear 126 may be configured such that first disc surface 124 imparts a reaction force on insert 102 that opposes the force acting in the direction from insert ear 126 toward brake disc 80, such that movement of insert 102 in the first axial direction A1 is substantially limited and/or prevented. In some examples, insert ear 126 is configured to cover first disc surface 124 when insert 102 (e.g., back face 122) covers first torque face 114. In some examples, insert ear 126 extends from body section 118 in a substantially tangential direction of brake disc 80 (e.g., in the second tangential direction T2) when insert 102 is positioned within disc slot 86. In examples, first disc surface 124 is adjacent disc slot 86 and/or first torque face 114.

In some examples, insert 102 is configured to cover a second surface 130 of brake disc 80 ("second disc surface 130") when insert 102 is positioned within disc slot 86. In examples, insert 102 includes a second insert ear 128 configured to cover second disc surface 130. In examples, second insert ear 128 is configured to cover second disc surface 130 when insert ear 126 covers first disc surface 124 and/or body section 118 covers first torque face 114. Second insert ear 128 may be configured to engage second disc surface 130 when insert 102 experiences a force acting substantially in the second axial direction A2. Second insert ear 128 may be configured such that second disc surface 130 imparts a reaction force on insert 102 that opposes the force acting substantially in the second axial direction A2, such that movement of insert 102 in the second axial direction A2 is substantially limited and/or prevented. In examples, second insert ear 128 is configured to cover second disc surface 130 when insert 102 (e.g., back face 122) covers first torque face 114. In examples, second insert ear 128 extends from body section 118 in a substantially tangential direction of brake disc 80 (e.g., in the second tangential direction T2) when insert 102 is positioned within disc slot 86. In examples, second disc surface 130 is adjacent disc slot 86 and/or first torque face 114. In some examples, first torque face 114 is substantially between second disc surface 130 and first disc surface 124.

Insert 102 includes a rivet slot 108 configured to allow passage of rivet 104 (e.g., a rivet shank 110) through insert 102 to secure insert 102 to brake disc 80. In examples, insert ear 126 defines rivet slot 108. Washer 106 is configured to position between a rivet head 112 of rivet 104 and insert 102 when rivet 104 secures insert 102 to brake disc 80. For example, washer 106 may define a washer hole 107 configured to allow passage of rivet shank 110 through washer hole 107. Rivet shank 110 may be configured to pass through washer hole 107, pass through rivet slot 108, and extend into brake disc 80 to secure insert 102 to brake disc 80. In examples, rivet shank 110 is configured to insert into brake disc 80 via a rivet hole 109 in brake disc 80. In examples, rivet 104 and/or rivet hole 109 are configured such that motion of insert 102 relative to brake disc 80 (e.g., in a tangential direction of brake disc 80) causes motion of insert 102 relative to rivet 104 when rivet 104 is inserted into rivet hole 109. In some examples, rivet 104 and/or rivet hole 109 are configured such that rivet 104 is substantially stationary relative to brake disc 80 when rivet 104 inserts into brake disc 80 via rivet hole 109.

Washer hole 107 may be configured (e.g., dimensioned) to prevent passage of rivet head 112 through washer hole 107 when rivet 104 (e.g., rivet shank 110) extends through washer hole 107, extends through rivet slot 108, and extends into brake disc 80. In examples, rivet 104 (e.g., rivet shank 110 and/or rivet head 112) is configured to remain substantially stationary with respect to brake disc 80 when rivet 104 inserts into rivet hole 109 (e.g., remain substantially stationary with respect to brake disc 80 when insert 102 moves relative to brake disc 80 in the tangential direction of brake disc 80). Washer 106 may be configured to remain substantially stationary with respect to brake disc 80 when rivet 104 (e.g., rivet shank 112) extends through washer hole 107 and inserts into rivet hole 109.

Rivet slot 108 is configured to allow motion of insert 102 in a tangential direction of brake disc 80 (e.g., in the first tangential direction T1 and/or second tangential direction T2) when insert 102 (e.g., drive face 120) engages a rotor drive key or spline extending through disc slot 86 and when insert 102 is connected to brake disc 80 via rivet 104. For example, when a braking operation causes brake disc 80 to cause motion of insert 102 relative to the rotor drive key or spline extending through disc slot 86, rivet slot 108 may be configured such that a resulting engagement of insert 102 (e.g., drive face 120) and the rotor drive key or spline causes tangential motion of insert 102 relative to brake disc 80. The tangential motion of insert 102 allowed by rivet slot 108 may cause insert 102 to engage brake disc 80 (e.g., cause back face 122 to engage first torque face 114). The engagement of back face 122 with brake disc 80 as drive face 120 engages the rotor drive key or spline causes brake disc 80 to impart a torque to the rotor drive key or spline via insert 102. In examples, rivet slot 108 is configured to allow motion of insert 102 in a tangential direction of brake disc 80 relative to rivet 104 and/or washer 106 (e.g., when rivet shank 112 extends into brake disc 80 via rivet hole 109).

For example, FIG. 7 illustrates a schematic plan view of a portion of insert assembly 100 positioned within disc slot 86, with second axial direction A2 perpendicular to and proceeding out of the page, first axial direction A1 (not shown) perpendicular to and proceeding in to the page, and first radial direction R1, second radial direction R2, first tangential direction T1, and second tangential direction T2 parallel to the page. Washer 106 and rivet 104 are depicted as transparent and illustrated with dashed lines. Rivet shank 110 extends through washer hole 107, rivet slot 108, and into brake disc 80. Washer 106 is positioned between rivet head 112 and insert 102. Insert ear 126 defines rivet slot 108. Insert 102 (e.g., insert ear 126) may define a boundary 132 of rivet slot 108 ("slot boundary 132") surrounding at least some portion of rivet slot 108. In examples, slot boundary 132 defines rivet slot 108 such that rivet slot 108 extends through insert 102 (e.g., insert ear 126) in an axial direction of brake disc 80 (e.g., in the first axial direction A1 and/or the second axial direction A2).

Rivet slot 108 defines a first dimension D1 in a substantially tangential direction of brake disc 80 (e.g., in the first tangential direction T1 and/or the second tangential direction T2). First dimension D1 may be configured to allow tangential motion of insert 102 relative to rivet 104, washer 106, and/or brake disc 80 when rivet shank 110 extends through rivet slot 108 and into brake disc 80. In examples, rivet slot 108 is elongated such that first dimension D1 exceeds a cross-sectional dimension (e.g., a diameter) of rivet shank 110. Rivet slot 108 may be configured such that insert 102 may move relative to rivet 104, washer 106, and/or brake disc 80 when a rotor drive key or a spline extending through disc slot 86 imparts a force on insert 102 in a tangential direction of brake disc 80. For example, first dimension D1 may exceed the cross-sectional dimension of rivet shank 110 by about 5%, 10%, 25%, 50%, 100%, or another percentage of the cross-sectional dimension of rivet shank 110.

Rivet slot 108 defines a second dimension D2 in a substantially radial direction of brake disc 80 (e.g., in the first radial direction R1 and/or the second radial direction R2). Second dimension D2 may be substantially perpendicular to first dimension D1 (e.g., perpendicular or nearly perpendicular to the extent permitted by manufacturing tolerances). In examples, second dimension D2 is less than first dimension D1. In examples, rivet slot 108 is configured such that at least second dimension D2 provides radial support to insert 102 when insert 102 positioned within disc slot 86. For example, rivet slot 108 (e.g., slot boundary 132) may be configured to engage rivet 104 when insert 102 experiences a force acting in a direction from insert 102 toward brake disc 80 and/or a force acting in a direction from brake disc 80 toward insert 102 (e.g., a force in the first radial direction R1 and/or a force in the second radial direction R2). Rivet slot 108 may be configured such that slot boundary 132 imparts a reaction force on insert 102 that opposes the force acting in the direction acting in the direction from insert 102 toward brake disc 80 or the direction from brake disc 80 toward insert 102, such that movement of insert 102 in the first radial direction R1 and/or second radial direction R2 is substantially limited. For example, rivet slot 108 may be configured such that second dimension D2 is slightly larger than the cross-sectional dimension of rivet shank 110 (e.g., by about 1%, 5,%, 10%, or another percentage of the cross-sectional dimension of rivet shank 110) while remaining less than first dimension D1. In examples, first dimension D1 is a dimension measured in the first tangential direction T1 and/or the second tangential direction T2. Second dimension D2 may be a dimension measured in the direction substantially perpendicular to first dimension D1.

Rivet slot 108 and/or rivet 104 may be configured to allow for motion of insert 102 relative to brake disc 80, rivet 104, and/or washer 106 in the first tangential direction T1 and the second tangential direction T2. For example, rivet slot 108 and/or rivet 104 may be configured to allow for movement of insert 102 relative to brake disc 80, rivet 104, and/or washer 106 in the first tangential direction T1 when insert 102 receives a force in the first tangential direction T1, such that back face 122 moves in a direction away from first torque face 114. Rivet slot 108 and/or rivet 104 may be configured to allow for movement of insert 102 relative to brake disc 80, rivet 104, and/or washer 106 in the second tangential direction T2 when insert 102 receives a force in the second tangential direction T2, such that back face 122 moves in a direction toward torque face 114. Insert 102 may be configured to receive the force in the first tangential direction T1 and/or the second tangential direction T2 from a rotor drive key or a spline extending through disc slot 86, as a result of an acceleration or deceleration of insert 102 (e.g., imparted due to vibrations of brake disc 80, acceleration or deceleration of a vehicle carrying brake disc 80, a gravity vector acting on insert 102, or another event causing the acceleration or deceleration), or from another source. In examples, insert 102 is configured to move relative to brake disc 80, rivet 104, and washer 106 when insert 102 receives the force in the first tangential direction T1 and/or the second tangential direction T2.

In examples, rivet slot 108 is configured to allow insert 102 to substantially pivot around rivet shank 110 to at least some degree when torque is imparted by brake disc 80 (e.g., disc slot 86) to a rotor drive key or a spline extending through disc slot 86. Pivoting of insert 102 around rivet shank 110 may allow insert 102 (e.g., back face 122) to seat more firmly and conform more effectively against brake disc 80 (e.g., first torque face 114) when the torque is imparted. This may allow the insert 102 to distribute forces (e.g., reaction forces imparted to brake disc 80 from the rotor drive key or spline) more effectively over a torque face (e.g., first torque face 114) of brake disc 80, reducing stresses generated on brake disc 80 during a braking operation.

In examples, insert 102 defines a gap G (FIGS. 4 and 6) configured to receive a portion of disc 80 when insert 102 is positioned in disc slot 86. Insert 102 may be configured such that gap G receives brake disc 80 when insert ear 126 covers first disc surface 124 and/or second insert ear 128 covers second disc surface 130. Insert 102 may be configured such that gap G receives brake disc 80 when back face 122 covers first torque face 114. In examples, insert 102 defines gap G over a displacement DG substantially separating insert ear 126 and second insert ear 128. In examples, displacement DG is substantially parallel to the axial direction of brake disc 80 (e.g., parallel or nearly parallel to the extent permitted by manufacturing tolerances). In some examples, insert 102 defines displacement DG such that insert ear 126 slidably engages disc 80 (e.g., first disc surface 124) and/or second insert ear 128 slidably engages disc 80 (e.g., second disc surface 130) when insert 102 receives disc 80 within gap G.

Insert 102 may define displacement DG with respect to a radial direction of brake disc 80 in a manner configured to, for example, provide axial, radial, and/or tangential support to insert 102 when insert 102 is positioned within disc slot 86. In some examples, displacement DG remains substantially constant (e.g., constant or nearly constant to the extent permitted by manufacturing tolerances) as insert ear 126 and second insert ear 128 extend in a radial direction of brake disc 80 (e.g., in the first radial direction R1 and/or second radial direction R2). In some examples, displacement DG varies with respect to the radial direction of brake disc 80. For example, the displacement DG may increase in the first radial direction R1, such that insert ear 126 and second insert ear 128 generally slant away from each other as insert ear 126 and second insert ear 128 extend in the first radial direction R1. The displacement DG may decrease in the first radial direction R1, such that insert ear 126 and second insert ear 128 generally slant toward each other as insert ear 126 and second insert ear 128 extend in the first radial direction R1. Insert 102 may be configured to define DG with respect to the first radial direction R1 in any manner such that, for example, insert ear 126 engages first disc surface 124 when insert 102 experiences a force acting substantially in the first axial direction A1 and/or second insert ear 128 engages second disc surface 130 when insert 102 experiences a force acting substantially in the second axial direction A2. In some examples, insert 102 defines a displacement configured to vary in a tangential direction of brake disc 80. For example, insert 102 may be configured to define the displacement such that the displacement increases in the second tangential direction T2, such that, for example, insert ear 126 and second insert ear 128 generally slant away from each other as insert ear 126 and second insert ear 128 extend (e.g., away from body 118) in the second tangential direction T2. Insert 102 may be configured to define the displacement such that the displacement increases in the first tangential direction T1, such that, for example, insert ear 126 and second insert ear 128 generally slant towards each other as insert ear 126 and second insert ear 128 extend (e.g., away from body 118) in the second tangential direction T2.

In some examples, for example as illustrated in FIG. 6., second insert ear 128 defines a second rivet slot 134 configured to allow passage of a rivet (e.g., rivet 104 or another rivet) through second insert ear 128 to assist in securing insert 102 to brake disc 80. Insert assembly 100 may include a second washer 136 configured to position between a rivet head 138 and second insert ear 128 when the rivet passes through second rivet slot 134 and into brake disc 80. In examples, second washer 136 defines a second washer hole 137 configured to allow passage of the rivet through second washer hole 137. Second washer hole 137 may be configured (e.g., dimensioned) to prevent passage of second rivet head 138 through second washer hole 137 when the rivet extends through second washer hole 137, extends through second rivet slot 134, and extends into brake disc 80. Second washer 136 may be configured to position between rivet head 138 and second rivet slot 134 when the rivet passes through second washer hole 137, second rivet slot 134, and into brake disc 80.

Rivet head 112 may be configured to provide axial support to washer 106 and/or insert 102 when rivet 104 extends through washer hole 107 and rivet slot 108 and insert 102 is positioned within disc slot 86. For example, rivet head 112 may be configured to engage (or remain engaged with) washer 106 when washer 106 experiences a force acting in a direction from brake disc 80 toward washer 106 (e.g., a force in the second axial direction A2). Rivet 104 may be configured such that rivet head 112 imparts a reaction force on washer 106 that opposes the force acting in the direction from brake disc 80 toward washer 106, such that movement of washer 106 in the second axial direction A2 is substantially limited and/or prevented. Washer 106 may be configured to transmit at least some portion of the reaction force exerted by rivet head 112 to insert ear 126, such that movement of insert ear 126 in the second axial direction A2 is substantially limited and/or prevented.

In examples, rivet 104 (e.g., rivet shank 110) is configured to extend through both rivet slot 108 and second rivet slot 134 at the same time. For example, rivet 104 may be configured to extend (e.g., via rivet hole 109) between disc first side 91 (e.g., first disc surface 124) and disc second side 93 (e.g., second disc surface 125). In examples, rivet head 138 is a second rivet head at a second end portion of rivet shank 110 (e.g., a second end portion opposite the first end portion of rivet shank 110). Hence, rivet shank 110 may be configured to pass through washer hole 107, rivet slot 108, brake disc 80, second rivet slot 134, and second washer hole 137. Rivet 104 may be configured such that washer 106 is between rivet head 112 and first insert ear 126 and second washer 136 is between rivet head 138 and second insert ear 128 when rivet shank 110 extends (e.g., via rivet hole 109) between disc first side 91 (e.g., first disc surface 124) and disc second side 93 (e.g., first disc surface 124). Second insert ear 128, second rivet slot 134, second washer 136, second washer hole 137, the rivet extending through second washer hole 137 (e.g., rivet 104), rivet head 138, rivet hole 109, and/or second disc surface 130 may be configured individually and relative to each other in the same or similar manner as that described for the individual and relative configurations described for first insert ear 126, rivet slot 108, washer 106, washer hole 107, rivet 104, rivet head 112 and/or first disc surface 124.

For example, second rivet slot 134 may be configured to allow motion of insert 102 (e.g., relative to brake disc 80, rivet 104, and/or second washer 136) in a tangential direction of brake disc 80 (e.g., in the first tangential direction T1 and/or second tangential direction T2) when insert 102 (e.g., drive face 120) engages a rotor drive key or spline extending through disc slot 86 and insert 102 is connected to brake disc 80 via rivet 104. The tangential motion allowed by second rivet slot 134 may cause insert 102 to engage brake disc 80 (e.g., cause back face 122 to engage first torque face 114). Second rivet slot 134 may be configured to allow the tangential motion of insert 102 when rivet slot 108 allows the tangential motion of insert 102. For example, when a braking operation causes brake disc 80 to cause motion of insert 102 relative to the rotor drive key or spline extending through disc slot 86, insert 102 may be configured such that rivet slot 108 and second rivet slot 134 allow the tangential motion of insert 102 relative to brake disc 80, rivet 104, washer 106, and/or second washer 136. Insert 102 may be configured such that insert ear 126 slides over first disc surface 124 and/or second insert ear 128 slides over second disc surface 130 when rivet slot 108 and second rivet slot 134 allow the tangential motion of insert 102 relative to brake disc 80, rivet 104, washer 106 and/or second washer 136 ("washers 106, 136"). In examples, second rivet slot 134 is elongated and includes a dimension similar to (e.g., identical or nearly identical to the extent permitted by manufacturing tolerances) dimension D1 of rivet slot 108 and a dimension similar to dimension D2 of rivet slot 108.

In examples, rivet slot 108 and/or second rivet slot 134 ("rivets slots 108, 134") are configured to allow for tangential motion of insert 102 relative to brake disc 80, rivet 104, and/or washers 106, 136 in a manner reducing and/or substantially limiting loading (e.g., shear loading) of rivet shank 110. For example, insert assembly 100 (e.g., body section 118 and/or rivet slots 108, 134) may be configured such that, when insert assembly 100 is positioned within disc slot 86 and insert 102 moves tangentially with respect to brake disc 80, back face 122 engages brake disc 80 such that slot boundary 132 of rivet slot 108 is substantially prevented from imparting a force (e.g., a shear force) against rivet shank 110 as brake disc 80 imparts torque to a rotor drive key or spline via insert 102. This may reduce and/or substantially eliminate shear forces imparted to the rivet 104, such that the rivet 104 (e.g., rivet shank 110) remains relatively unloaded by the impartation of torque from brake disc 80 to the rotor drive key or spline. For example, rivet shank 110 may remain relatively unloaded compared to a rivet shank extending through a nonelongated, circular rivet slot.

Figure 8:
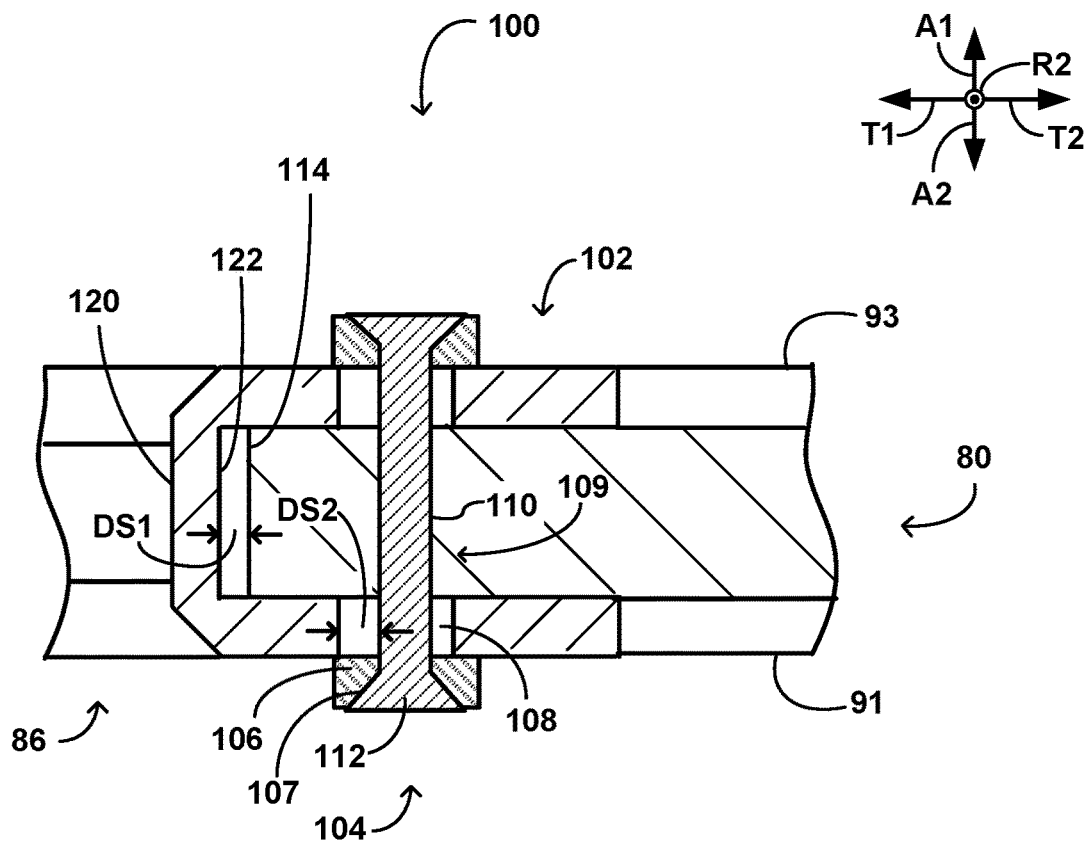
FIG. 8 is a cross-sectional top view of the insert of FIG. 4 displaced from a torque face of the brake disc, with a cutting plane parallel to an axial direction of a brake disc.
Figure 9:
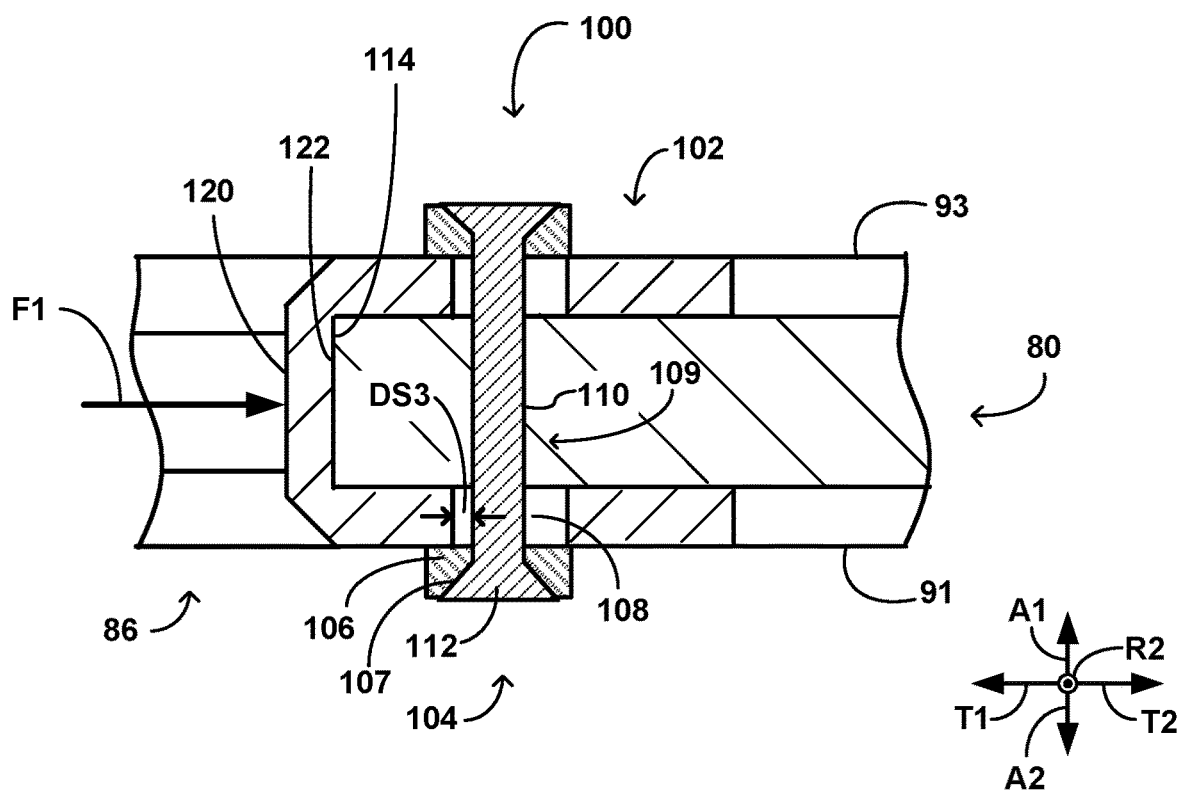
FIG. 9 is a cross-sectional top view of the insert of FIG. 4 engaged with the torque face of the brake disc, with a cutting plane parallel to an axial direction of a brake disc.

For example, FIGS. 8 and 9 are cross-sectional top views of a portion of insert assembly 100 positioned within disc slot 86, with the cross-section taken over the cutting plane illustrated as B-B' in FIG. 5. In FIGS. 8 and 9, the second radial direction R2 is perpendicular to and proceeds out of the page, the first radial direction R1 is perpendicular to and proceeds into the page, and first axial direction A1, second axial direction A2, first tangential direction T1, and second tangential direction T2 are parallel to the page. FIG. 8 depicts the portion of insert assembly 100 with an absence of forces acting on insert 102 (e.g., body section 118) in the first tangential direction T1 or the second tangential direction T2. FIG. 9 depicts the portion of insert assembly 100 with a force F1 acting on insert 102 (e.g., body section 118) in the second tangential direction T2, such that insert 102 has moved relative to brake disc 80, rivet 104, and/or washers 106, 136 as compared to the position of insert 102 depicted in FIG. 8.

Referring to FIG. 8, with insert 102 secured to brake disc 80 by rivet 104, insert 102 is configured to translate a first distance DS1 relative to brake disc 80 to cause back face 122 of insert 102 to engage first torque face 114 of brake disc 80. Insert 102 is configured to translate the first distance DS1 when force F1 acts on body section 118 of insert 102 (e.g., drive face 120) in the second tangential direction T2. Force F1 may be a force imparted to drive face 120 from a rotor drive key or a spline extending through disc slot 86. Force F1 may result from, for example, contact between the rotor drive key or the spline and drive face 120 as brake disc 80 experiences a torque (e.g., a torque caused by rotation of wheel 10 (FIG. 1), and/or a shearing force imparted to disc first side 91 and/or disc second side 93 from a rotor disc or stator disc within disc stack 58). For example, force F1 may be a force from a rotor drive key as the rotor drive key imparts a torque around disc axis A (FIG. 3) from wheel 10 to brake disc 80. As another example, force F1 may be a force imparted from a spline (e.g., a reaction force) as brake disc 80 transfers a torque around disc axis A to the spline.

In examples, rivets slots 108, 134 are configured to substantially limit and/or prevent slot boundary 132 from imparting a force (e.g., a force in the second tangential direction T2) from body section 118 to rivet shank 110 when the force F1 is imparted to insert 102. In examples, rivet slots 108, 134 are configured such that rivet shank 110 is separated from a portion of slot boundary 132 by a second distance DS2 greater than first distance DS1 when insert 102 is positioned within disc slot 86. In examples, second distance DS2 is a portion (e.g., less than 100%) of first dimension D1 (FIG. 7). Insert 102 may be configured such that engagement (e.g., contact) of back face 122 with first torque face 114 ceases the movement of insert 102 relative to brake disc 80, such that rivet shank 110 is separated from the portion of slot boundary by a third distance DS3 (FIG. 9). The separation of rivet shank 110 from the portion of slot boundary 132 by the distance DS3 may substantially limit and/or prevent slot boundary 132 from imparting a force (e.g., a force in the second tangential direction T2) from body section 118 to rivet shank 110 when the force F1 is imparted to insert 102.

In examples, distance DS1, distance DS2, and/or distance DS3 are distances extending in a direction substantially parallel (e.g., parallel or nearly parallel to the extent permitted by manufacturing tolerances) to the first tangential direction T1 and/or the second tangential direction T2 of brake disc 80. In examples, distance DS3 is a portion of and less than distance DS2. In some examples, insert 102 is configured such that when second back face 144 (FIG. 6) engages (e.g., contacts) second torque face 116, back face 122 is separated from first torque face 114 by a distance greater than or equal to distance DS1, and/or rivet shank 110 is separated from slot boundary 132 in the first tangential direction T1 or the second tangential direction T2 by a distance greater than or equal to distance DS2.

Figure 10:
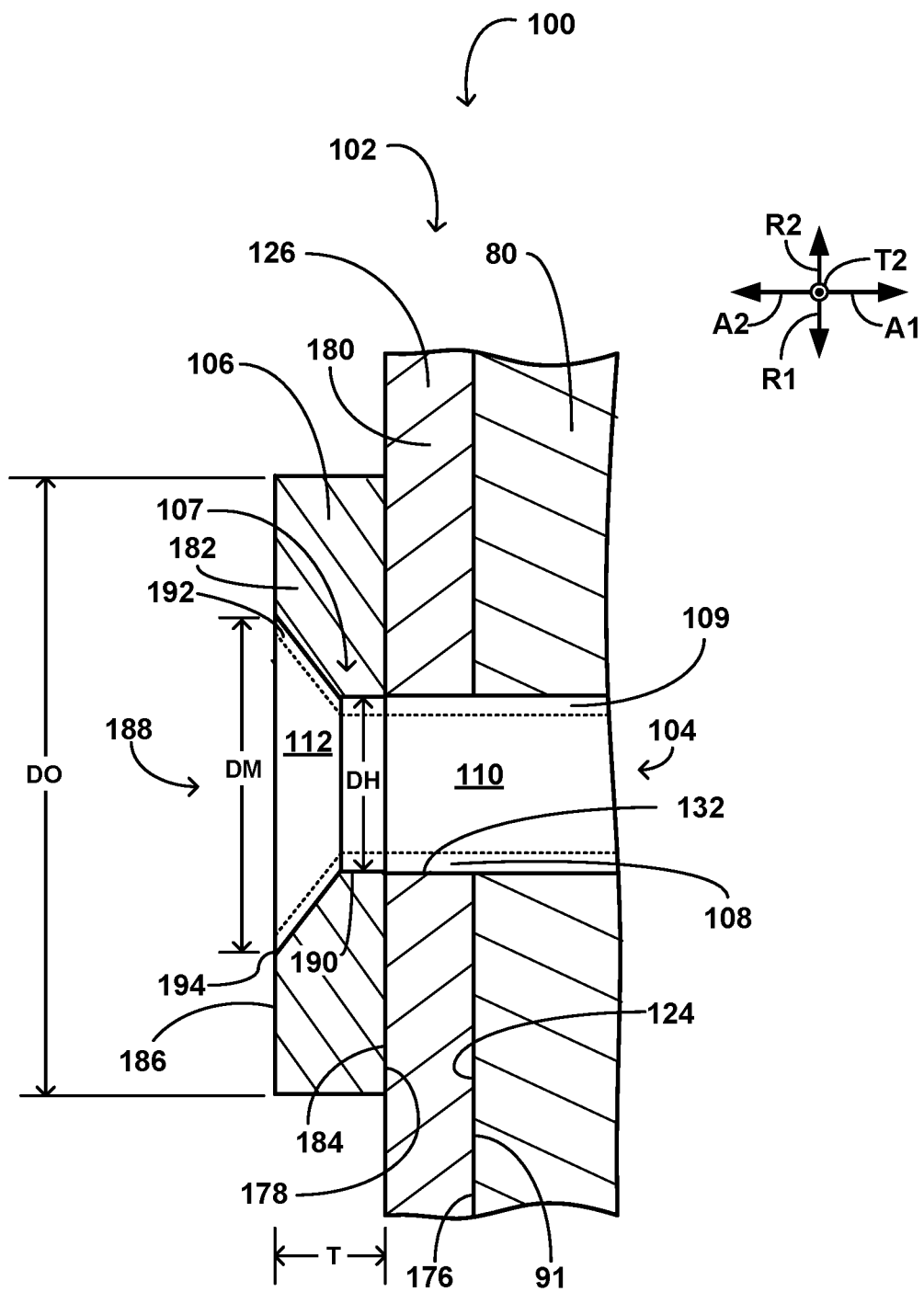
FIG. 10 is a cross-sectional side view of the insert of FIG. 4 including a washer and a portion of an insert ear, with a cutting plane parallel to an axial direction of a brake disc.

As discussed, washer 106 is configured to position between rivet head 112 and insert ear 126 when insert 102 is positioned in disc slot 86 and rivet 104 extends through rivet slot 108. For example, FIG. 10 is a cross-sectional side view of a portion of insert assembly 100 including washer 106 and a portion of insert ear 126, with the cross-section taken over the cutting plane illustrated as C-C' in FIG. 5. In FIG. 10, second tangential direction T2 is perpendicular to and proceeds out of the page, first tangential direction T1 (not shown) is perpendicular to and proceeds into the page, and first axial direction A1, second axial direction A2, first tangential direction T1, and second tangential direction T2 parallel to the page. Rivet 104 is depicted as transparent and illustrated with dashed lines, and extends through washer hole 107, rivet slot 108, and into rivet hole 109 to secure insert 102 to brake disc 80.

In examples, insert ear 126 includes an insert ear body 180 defining a first ear surface 176 configured to face first disc surface 124 of brake disc 80 when rivet 104 secures insert 102 to brake disc 80. Insert ear body 180 defines a second ear surface 178 configured to face washer 106 when washer 106 is positioned between rivet head 112 and insert ear 126. In examples, first ear surface 176 is configured to engage (e.g., slidably engage) first disc surface 124 when rivet 104 secures insert 102 to brake disc 80. Second ear surface 178 may be configured to engage (e.g., slidably engage) washer 106 when rivet 104 secures insert 102 to brake disc 80. For example, first ear surface 176 may be configured to slide over (e.g., slide against) first disc surface 124 and/or second ear surface 178 may be configured to slide over (e.g., slide against) washer 106 when insert 102 moves in a tangential direction (e.g., in the first tangential direction T1 or second tangential direction T2) relative to brake disc 80, rivet 104, and/or washer 106.

Washer 106 may include a washer body 182 defining a first washer surface 184 configured to face insert 102 (e.g., second ear surface 178) when rivet 104 secures insert 102 to brake disc 80. Washer body 182 defines a second washer surface 186 configured to face in a direction away from insert 102 (e.g., away from second ear surface 178) when washer 106 is positioned between rivet head 112 and insert ear 126. In examples, first washer surface 184 is configured to engage (e.g., slidably engage) insert ear 126 (e.g., second ear surface 178) when rivet 104 secures insert 102 to brake disc 80. Washer body 182 may be configured to remain substantially stationary with respect to rivet 104 when rivet 104 secures insert 102 to brake disc 80 (e.g., when rivet 104 extends through washer hole 107, rivet slot 108, and into rivet hole 80). For example, first washer surface 184 may be configured to slide relative to (e.g., slide against) second ear surface 178 when insert 102 moves in a tangential direction (e.g., in the first tangential direction T1 or second tangential direction T2) relative to brake disc 80, rivet 104, and/or washer 106. Washer body 182 may be configured to remain substantially stationary with respect to rivet 104, and/or brake disc 80 when insert 102 moves in the tangential direction relative to brake disc 80, rivet 104, and/or washer 106.

In examples, at least some portion of insert ear body 180 separates first ear surface 176 and second ear surface 178. In examples, first ear surface 176 and/or second ear surface 178 are substantially parallel (e.g., parallel or nearly parallel to the extent permitted by manufacturing tolerances) to a plane defined by an axial direction of brake disc 80 (e.g., first axial direction A1 and/or second axial direction A2) and a radial direction of brake disc 80 (e.g., first radial direction R1 and/or second radial direction R2) when insert 102 is positioned with disc slot 86.

In examples, at least some portion of washer body 182 separates first washer surface 184 and second washer surface 186. In examples, first washer surface 184 and/or second washer surface 186 are substantially parallel (e.g., parallel or nearly parallel to the extent permitted by manufacturing tolerances) to a plane defined by an axial direction of brake disc 80 (e.g., first axial direction A1 and/or second axial direction A2) and a radial direction of brake disc 80 (e.g., first radial direction R1 and/or second radial direction R2) when insert 102 is positioned with disc slot 86. Hence, insert assembly 100 may be configured such that, during tangential motion of insert 102 relative to brake disc 80, rivet 104, and/or washer 106, insert 102 may slide in a tangential direction (e.g., in the first tangential direction T1 or second tangential direction T2) between washer 106 and brake disc 80.

In some examples, rivet head 112 is an orbitally riveted head fabricated using an orbital riveting tool (e.g., a peen tool). Washer 106 may be configured to allow for the orbital riveting (and/or another cold forming process) of rivet head 112 in a manner which limits and/or substantially prevents deformation of rivet head 112 into rivet slot 108 during the orbital riveting process. For example, insert 102 may be positioned within disc slot 86 and rivet shank 110 extended through washer hole 107, rivet slot 108, and into the brake disc 80 (e.g., via rivet hole 109), prior to fabricating rivet head 112. Rivet head 112 may be fabricated by deforming a portion of rivet 104 (e.g., an end portion 188 at an end of rivet shank 110) to cause end portion 188 to substantially collapse against washer 106. Washer 106 may be configured to substantially separate the forming or formed rivet head 112 from rivet slot 108 to, for example, limit and/or substantially prevent rivet 104 from deforming into rivet slot 108.

Washer 106 may include a boundary 190 ("washer hole boundary 190") which defines washer hole 107. Washer hole boundary 190 may be configured to radially support a portion of rivet shank 110 (e.g., a portion immediately adjacent the forming or formed rivet head 112) to, for example, limit and/or substantially preventing expansion of rivet shank 110 within rivet slot 108 during the orbital riveting process. Hence, washer 106 may be configured to reduce and/or limit physical interference between rivet slot 108 and rivet head 112 and/or rivet shank 110 that might otherwise limit and/or substantially prevent motion of the insert 102 relative to brake disc 80, washer 106, and/or rivet 104. In examples, rivet 104 is a solid rivet and rivet shank 110 is substantially solid rivet shank (rather than, e.g., a hollow rivet, semi-tubular rivet), such that the rivet may be considered a solid rivet. For example, rivet 104 may be a solid rivet defining a solid, unified body over an outer cross-sectional dimension (e.g., an outer diameter) of rivet shank 110.

Washer 106 may define a countersink 192, for example, reduce a length of rivet shank 110 and/or limit a protrusion of rivet head 112 beyond washer 106. For example, washer 106 may define countersink 192 to reduce and/or substantially eliminate a protrusion of rivet head 112 beyond second washer surface 186 in the second axial direction A2. In examples, countersink 192 is a portion of washer hole 107. Countersink 192 may be present to reduce potential interference between brake disc 80 and other discs within a disc stack (e.g., one or more of rotor discs 60, 61, 62, 63 and/or stator discs 64, 65, 66 within disc stack 58 (FIG. 2)). In examples, countersink 192 is configured such rivet head 112 imparts a reaction force on washer 106 opposing a force on washer 106 acting in a direction from washer 106 toward rivet head 112 (e.g., a force in the second axial direction A2), such that movement of washer 106 in a direction from washer 106 toward rivet head 112 is substantially limited and/or prevented.

Countersink 192 may define an opening which opens to second washer surface 186. In examples, countersink 192 defines a major dimension DM and a hole dimension DH. Major dimension DM may be greater than hole dimension DH. In examples, major dimension DM is a cross-sectional dimension (e.g., a diameter) of a countersink boundary 194 defined by washer 106 (e.g., defined by a closed boundary of second washer surface 186). In examples, hole dimension DH is a cross-sectional dimension (e.g., a diameter) of a portion of washer hole 107 configured to surround rivet shank 110. Countersink boundary 194 may define, for example, a curved shape such as a circle, oval, or other curved shape. In some examples, countersink boundary 194 defines a curvilinear shape comprising curved and linear segments. In other examples, countersink boundary 194 defines a polygon. In examples, countersink 192 is a tapered inset defining a countersink angle ("CS angle") which describes a taper as countersink 192 transitions from major dimension DM to minor dimension DH. In some examples, counter sink 192 is a counterbore defining an inset (e.g., a substantially cylindrical inset) extending from countersink boundary into washer body 182. The inset may define one or more sides extending from countersink boundary 194 into washer body in a direction substantially parallel (e.g., parallel or nearly parallel to the extent permitted by manufacturing tolerances) to first axial direction A1.

In examples, washer 106 is configured to substantially overhang at least some portion of rivet slot 108 when rivet 104 extends through washer hole 107 and rivet slot 108. For example, as depicted in FIG. 7, washer 106 may be configured to extend across (e.g., bridge and/or span) rivet slot 108 from a first portion of slot boundary 132 to a second portion of slot boundary 132, where the first portion of slot boundary 132 is displaced from the second portion of slot boundary 132 by second dimension D2. In examples, washer 106 is configured (e.g., dimensioned) such that, for example, washer 106 provides sufficient support to rivet 104 during an orbital riveting process or other type of riveting process as washer 106 extends across rivet slot 108. For example, washer 106 may define a thickness T such that washer 106 may provide sufficient support to cause rivet head 112 to collapse against washer 106 (e.g., second washer surface 186 and/or a surface defining countersink 192) as end portion 188 of rivet 104 is deformed (e.g., by an orbital riveting tool) to define rivet head 112.

Thickness T may be a dimension of washer 106 substantially parallel (e.g., parallel or nearly parallel to the extent permitted by manufacturing tolerances) to first axial direction A1 and/or second axial direction A2 when rivet 104 extends through washer hole 107 and into brake disc 80 (e.g., via rivet hole 109). In examples, washer 106 defines a outer dimension DO (e.g., an outer diameter) substantially parallel (e.g., parallel or nearly parallel to the extent permitted by manufacturing tolerances) to first radial direction R1 and/or second radial direction R2 when rivet 104 extends through washer hole 107 and into brake disc 80 (e.g., via rivet hole 109). In some examples, thickness T defines a dimension of at least 10% of a length defined by outer dimension DO, such as a length greater than 20%, 30%, or 40% of the length defined by outer dimension DO. In some examples, thickness T defines a dimension of at least 30% of a length defined by major dimension DM and/or hole diameter DH, such as a length greater than 20%, 30%, or 40% of the length defined by major dimension DM and/or hole diameter DH.

In examples, insert assembly 100 is configured to cover first torque face 114 and second torque face 116 when insert 102 is positioned within disc slot 86. Insert assembly 100 may be configured to allow movement of insert 102 toward first torque face 114 (e.g., in the second tangential direction T2) when insert 102 receives a force in the second tangential direction T2 and configured to allow movement of insert 102 toward second torque face 116 (e.g., in the first tangential direction T1) when insert 102 receives a force in the first tangential direction T1. In examples, when insert 102 is positioned in disc slot 86, insert 102 is configured to engage first torque face 114 when insert 102 receives the force in the second tangential direction T2 and configured to engage second torque face 116 when insert 102 receives the force in the first tangential direction T1.

Figure 11:
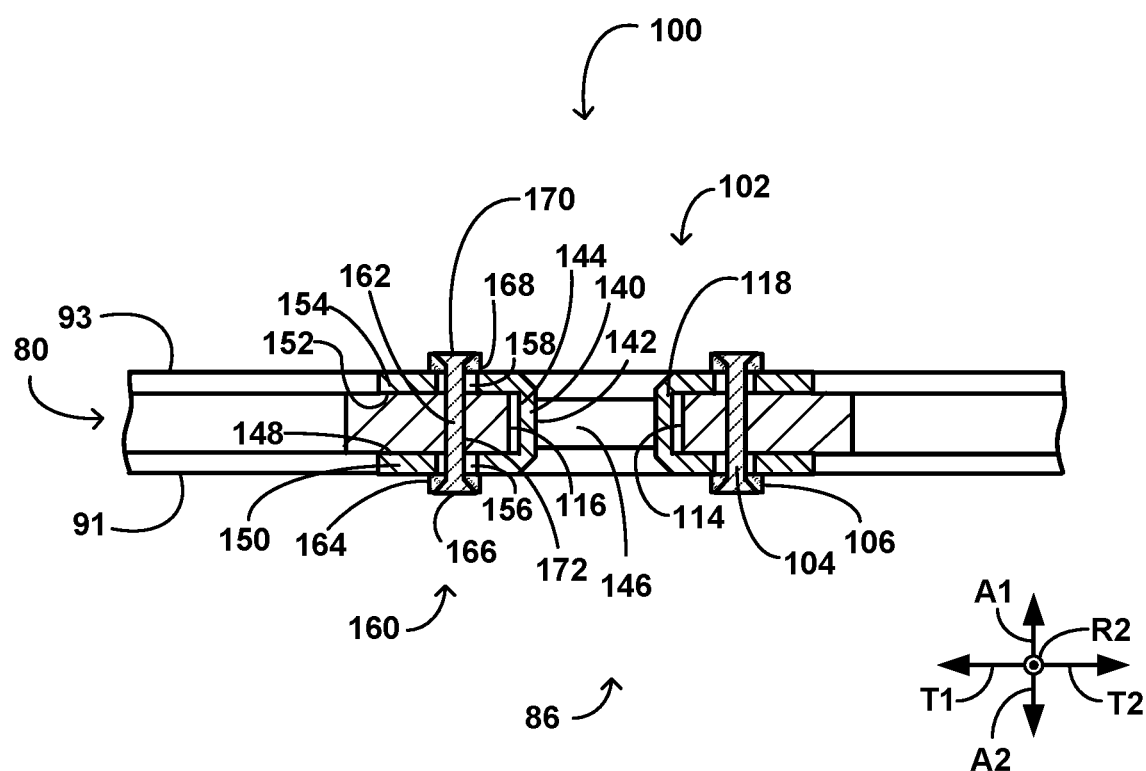
FIG. 11 is a cross-sectional top view of the insert of FIG. 4 including a bridge member, with a cutting plane parallel to an axial direction of a brake disc.

For example, FIG. 11 illustrates the cross-sectional top view of FIG. 6 including body section 118 of insert 102, first torque face 114, rivet 104, washer 106, and second torque face 116. In examples, insert assembly 100 (e.g., insert 102) includes a second body section 140 configured to cover second torque face 116 when insert 102 is positioned within disc slot 86. Second body section 140 defines a drive face 142 ("second drive face 142") and a back face 144 ("second back face 144") opposite second drive face 142. In examples, at least some portion of second body section 140 separates second drive face 142 and second back face 144. Second drive face 142 may be configured to engage a rotor drive key or a spline when insert 102 is positioned in disc slot 86 and brake disc 80 imparts a torque to the rotor drive key or spline (e.g., a torque imparting a force to the rotor drive key or spline in the second tangential direction T2). Second back face 144 may be configured to engage second torque face 116 when brake disc 80 imparts the torque to the rotor drive key or spline, such that the brake disc 80 imparts the torque to the rotor drive key or spline via insert 102.

Insert assembly 100 (e.g., insert 102) may be configured such that at least body section 118 and second body section 140 act as a substantially rigid body, such that, for example, a force causing movement of body section 118 relative to brake disc 80, rivet 104, and/or washer 106 further causes movement of second body section 140 relative to brake disc 80, rivet 104, and/or washer 106. In examples, insert assembly 100 is configured such that a force (e.g., a minimum force) imparted on insert 102 in the first tangential direction T1 may cause movement of body section 118 and second body section 140 in the first tangential direction T1. Insert assembly 100 may be configured such that a force (e.g., a minimum force) imparted on insert 102 in the second tangential direction T2 may cause movement of body section 118 and second body section 140 in the second tangential direction T2. In examples, insert assembly 100 is configured such that a rotor drive key or a spline extends between body section 118 and second body section 140 when insert 102 is positioned within disc slot 86 and the rotor drive key or spline extends through disc slot 86.

In examples, insert 102 includes a bridge member 146 configured transfer a force from body section 118 to second body section 140, and vice-versa. Bridge member 146 extends between body section 118 and second body section 140. In examples, insert 102 is configured such that bridge member 146 acts as a substantially rigid body with body section 118 and/or second body section 140, such that, for example, a force causing movement of body section 118 and/or second body section 140 relative to brake disc 80, rivet 104, and/or washer 106 causes movement of bridge member 146 relative to brake disc 80, rivet 104, and/or washer 106. For example, insert assembly 100 may be configured such that a force imparted on body section 118 and/or second body section 140 in the first tangential direction T1 may cause movement of bridge member 146 in the first tangential direction T1. Insert assembly 100 may be configured such that a force imparted on body section 118 and/or second body section 140 in the second tangential direction T2 may cause movement of bridge member 146 in the second tangential direction T2.

In examples, insert assembly 100 is configured such that, when insert 102 is positioned within disc slot 86 and the rotor drive key or a spline extends through disc slot 86, bridge member 146 is positioned between disc 80 and the rotor drive key or the spline. In examples, insert assembly 100 is configured such that, when insert 102 is positioned within disc slot 86 and the rotor drive key or the spline extends through disc slot 86, body section 118, bridge member 146, and second body section 140 substantially surround some portion of the rotor drive key or spline. In some examples, bridge member 146, body section 118, and second body section 140 define a substantially unified body (e.g., a unified body formed by casting, machining, or another process). In some examples, bridge member 146 may be attached to body section 118 and/or second body section 140 (e.g., attached by welding, soldering, a fastener, an adhesive, physical mating of bridge member 146 and body section 118 and/or second body section 140, or another attachment method).

Insert assembly 100 may include a third insert ear 150, a fourth insert ear 154, a third rivet slot 156, a fourth rivet slot 158, a second rivet 160 including a second rivet shank 162, rivet head 166, and/or rivet head 170, a third washer 164, and/or a fourth washer 168. Brake disc 80 may further define a third disc surface 148, a fourth disc surface 152, and/or a second rivet hole 172. Third insert ear 150, fourth insert ear 154, third rivet slot 156, fourth rivet slot 158, second rivet 160, second rivet shank 162, rivet head 166, rivet head 170, third washer 164, fourth washer 168, third disc surface 148, fourth disc surface 152, and/or second rivet hole 172 may be configured individually and relative to each other in the same or similar manner as that described for the individual and relative configurations described for insert ear 126, second insert ear 128, rivet slot 108, second rivet slot 134, rivet 104, rivet shank 110, rivet head 112, rivet head 138, washer 106, second washer 136, first disc surface 124, second disc surface 130, and/or rivet hole 109 respectively.

For example, third insert ear 150 of insert 102 may be configured to cover third disc surface 148 (FIG. 4) of brake disc 80 when insert 102 is positioned within disc slot 86. Third disc surface may be a portion of disc first side 91. In some examples, fourth insert ear 154 is configured to cover a fourth disc surface 152 (FIG. 6) of brake disc 80 when insert 102 is positioned within disc slot 86. In examples, third insert ear 150 and/or fourth insert ear 154 extend from second body section 140 in a substantially tangential direction of brake disc 80 (e.g., in the first tangential direction T1) when insert 102 is positioned within disc slot 86. In examples, third disc surface 148 and/or fourth disc surface 152 are adjacent disc slot 86 and/or second torque face 116.

In examples, third insert ear 150 and/or fourth insert ear 154 are configured to provide axial support to insert 102 when insert 102 is positioned within disc slot 86. For example, third insert ear 150 may be configured to engage (or remain engaged with) third disc surface 148 when insert 102 experiences a force acting in the first axial direction A1. Fourth insert ear 154 may be configured to engage (or remain engaged with) fourth disc surface 152 when insert 102 experiences a force acting in the second axial direction A2. Insert 102 may be configured such that third disc surface 148 imparts a reaction force on insert 102 (e.g., third insert ear 150) opposing the force acting in the first axial direction A1 and/or fourth disc surface 152 imparts a reaction force on insert 102 (e.g., fourth insert ear 154) opposing the force acting in the second axial direction A2, such that movement of insert 102 in the first axial direction A1 and/or the second axial direction A2 is substantially limited and/or prevented. In some examples, third insert ear 150 is configured to cover third disc surface 148 and/or fourth insert ear 154 is configured to cover fourth disc surface 152 when insert 102 (e.g., second back face 144) covers second torque face 116.

Insert 102 may include third rivet slot 156 (e.g., defined by third insert ear 150) and/or a fourth rivet slot 158 (e.g., defined by fourth insert ear 154) configured to allow passage of second rivet 160 (e.g., second rivet shank 162) through insert 102 to secure insert 102 to brake disc 80. Third washer 164 may be configured to position between rivet head 166 of second rivet 160 and insert 102 (e.g., third insert ear 150) when second rivet 160 secures insert 102 to brake disc 80. Fourth washer 168 may be configured to position between rivet head 170 of second rivet 160 and insert 102 (e.g., fourth insert ear 154) when second rivet 160 secures insert 102 to brake disc 80. For example, third washer 164 may define a washer hole configured to allow passage of second rivet shank 162 through third washer 164. Fourth washer 168 may define a washer hole configured to allow passage of second rivet shank 162 through fourth washer 168.

Second rivet shank 162 is configured to insert into brake disc 80 via second rivet hole 172 in brake disc 80. For example, second rivet shank 162 may be configured to extend (e.g., via second rivet hole 172) between disc first side 91 (e.g., third disc surface 148) and disc second side 93 (e.g., fourth disc surface 152). In the example shown in FIG. 11, second rivet 160 includes rivet head 170 at an opposite end of second rivet shank 162 from rivet head 166. Hence, second rivet shank 162 may be configured to pass through third washer 164, third rivet slot 156, brake disc 80, fourth rivet slot 158, and fourth washer 168. Second rivet 160 may be configured such that third washer 164 is between rivet head 166 and third insert ear 150 and fourth washer 168 is between rivet head 170 and fourth insert ear 154 when second rivet shank 162 extends (e.g., via second rivet hole 172) between disc first side 91 (e.g., third disc surface 148) and disc second side 93 (e.g., fourth disc surface 152).

Third rivet slot 156 and/or fourth rivet slot 158 may be configured to allow motion of insert 102 (e.g., relative to brake disc 80, rivet 104, second rivet 160, washer 106, second washer 136, third washer 164, and/or fourth washer 168) in a tangential direction of brake disc 80 (e.g., in the first tangential direction T1 and/or second tangential direction T2) when insert 102 (e.g., drive face 120) engages a rotor drive key or spline extending through disc slot 86 and insert 102 is connected to brake disc 80 via second rivet 160. The tangential motion allowed by third rivet slot 156 and/or fourth rivet slot 158 may cause insert 102 to engage brake disc 80 (e.g., cause second back face 144 to engage second torque face 116). For example, when a braking operation causes brake disc 80 to cause motion of insert 102 relative to the rotor drive key or spline extending through disc slot 86, insert 102 may be configured such that rivet slot 108, second rivet slot 134, third rivet slot 156, and/or fourth rivet slot 158 allow the tangential motion of insert 102 relative to brake disc 80, rivet 104, second rivet 160, washer 106, second washer 136, third washer 164, and/or fourth washer 168. In examples, each of third rivet slot 156 and/or fourth rivet slot 158 include a dimension similar to dimension D1 of rivet slot 108 and a dimension similar to dimension D2 of rivet slot 108.

Figure 12:
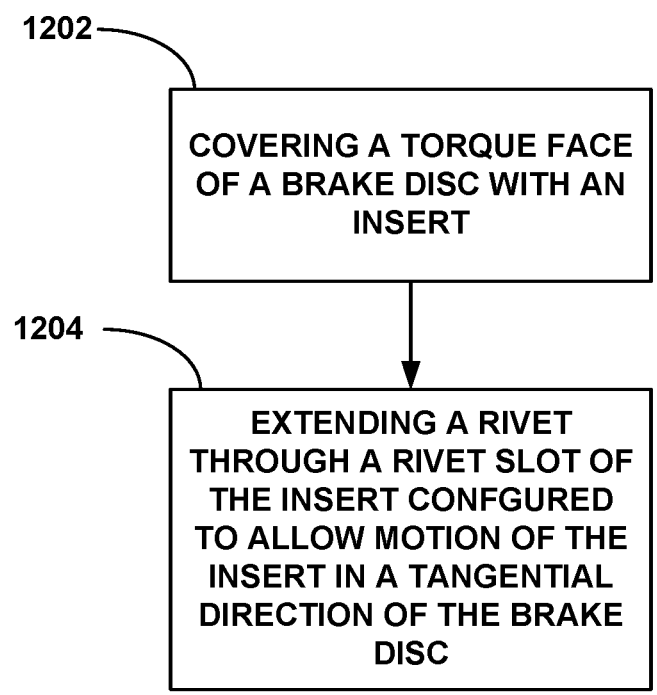
FIG. 12 is a flow diagram illustrating an example technique of positioning an insert assembly on a brake disc.

FIG. 12 illustrates a flow diagram of an example technique for positioning a drive insert on a disc slot of a brake disc. Although the technique is described with reference to insert assembly 100 and brake disc 80 of FIGS. 3-11, in other examples, the technique may be used with another insert assembly and brake disc.

The technique includes covering a first torque face 114 and/or a second torque face 116 of a brake disc 80 with an insert 102 to position insert 102 within a disc slot 86 of brake disc 80 (1202). In examples, covering first torque face 114 and/or a second torque face 116 includes covering first torque face 114 using back face 122. Insert ear 126 may cover first disc surface 124 and/or second insert ear 128 may cover second disc surface 130 when insert 102 covers first torque face 114 and/or a second torque face 116. In examples, third insert ear 150 covers third disc surface 148 and/or fourth insert ear 154 covers fourth disc surface 152 when insert 102 covers first torque face 114 and/or a second torque face 116. In examples, insert 102 receives a portion of brake disc 80 within a gap G defined by insert 102 when insert 102 covers first torque face 114 and/or a second torque face 116.

The technique includes extending a rivet 104 (e.g., a rivet shank 110) through a washer hole 107 of a washer 106, through a rivet slot 108 defined by insert ear 126, and into brake disc 80 to secure insert 102 to brake disc 80 (1204). Rivet slot 108 is configured to enable tangential motion of insert 102 relative to brake disc 80, rivet 104, and/or washer 106 when rivet 104 secures insert 102 to brake disc 80. Washer 106 may be positioned between a rivet head 112 of rivet 104 and insert ear 126 when rivet 104 secures insert 102 to brake disc 80. In examples, a first ear surface 176 slidably engages first disc surface 124 and a second ear surface 185 slidably engages a first washer surface 184 when rivet 104 secures insert 102 to brake disc 80.

In examples, rivet 104 extends through rivet hole 109 to secure insert 102 to brake disc 80. Rivet 104 may also extend through a second rivet slot 134 of second insert ear 128 when rivet 104 extends through rivet hole 109. In examples, rivet 104 extends through a second washer hole 137 of a second washer 136 when rivet 104 extends through second rivet slot 134. Second rivet slot 134 is also configured to allow for tangential motion of insert 102 relative to brake disc 80, rivet 104, and/or washer 106 when rivet 104 extends through second rivet slot 134 and/or second washer hole 137. Second washer 136 may be positioned between a rivet head 138 of rivet 104 and insert ear 126 when rivet 104 extends through second rivet slot 134 and second washer hole 137. In examples, second insert ear 128 slidably engages a disc second side 93 and second washer 136 slidably engages second insert ear 128 when rivet 104 extends through second rivet slot 134 and second washer hole 137.

In examples, the technique includes extending a second rivet 160 (e.g., a second rivet shank 162) through a washer hole of a third washer 164, through a third rivet slot 156 defined by third insert ear 150, and into brake disc 80 to secure insert 102 to brake disc 80. Second rivet 160 may extend through a second rivet hole 172 to secure insert 102 to brake disc 80. Second rivet 160 may extend through a fourth rivet slot 158 defined by fourth insert ear 154 when second rivet 160 extends through second rivet hole 172. In examples, second rivet 160 extends through a washer hole of a fourth washer 168 when second rivet 160 extends through fourth rivet slot 158. Third washer 164 may be positioned between a rivet head 166 of second rivet 160 and third insert ear 150 and/or fourth washer 168 may be positioned between a rivet head 170 of second rivet 160 and fourth insert ear 154 when second rivet 160 secures insert 102 to brake disc 80. In examples, third insert ear 150 slidably engages third disc surface 148 and third washer 164 slidably engages third insert ear 150 when second rivet 160 secures insert 102 to brake disc 80. In examples, fourth insert ear 154 slidably engages fourth disc surface 152 and fourth washer 168 slidably engages fourth insert ear 154 when second rivet 160 secures insert 102 to brake disc 80.

In some examples, the technique includes fabricating a rivet head 112, 138 using an orbital riveting tool (e.g., a peen tool) as rivet shank 110 extends through washer hole 107, 137, rivet slot 108, 134, and into brake disc 80 (e.g., via rivet hole 109). The technique may include fabricating rivet head 166, 170 using an orbital riveting tool (e.g., a peen tool) as second rivet shank 162 extends through washer 164, 168, rivet slot 156, 158, and into brake disc 80 (e.g., via second rivet hole 172). Fabricating rivet head 112, 138, 166, 170 may include deforming a portion of rivet 104, 160 (using, e.g., the orbital riveting tool) to cause an end portion (e.g., end portion 188) of rivet 104, 160 to substantially collapse against washer 106, 136, 164, 168 (e.g., substantially collapse against second washer surface 186 and/or a surface defined by countersink 192). Washer 106, 136, 164, 168 may substantially separate the forming or formed rivet head 112, 138, 166, 170 from rivet slot 108, 134, 156, 158 during and/or following the fabrication of rivet head 112, 138, 166, 170. In examples, a washer hole boundary (e.g., washer hole boundary 190) radially supports a portion of rivet shank 110, 162 to, for example, limit and/or substantially prevent expansion of rivet shank 110, 162 within rivet slot 108, 134, 156, 158 during and/or following the fabrication of rivet head 112, 138, 166, 170.

In some examples, the technique includes positioning rivet head 112, 138, 166, 170 in a countersink (e.g., countersink 192) defined by washer 106, 136, 164, 168. In examples, positioning rivet head 112, 138, 166, 170 in the countersink includes deforming a portion of rivet 104, 160 (using, e.g., the orbital riveting tool) to cause a portion of rivet 104, 160 (e.g., end portion 188) to substantially collapse against a surface defining a boundary of the countersink. In examples, washer 106, 136, 164, 168 substantially extends across (e.g., bridges and/or spans) at least some portion of rivet slot 108, 134, 156, 158 as the portion of rivet 104, 160 is deformed. Washer 106, 136, 164, 168 may extend across rivet slot 108, 134, 156, 158 from a first portion of a slot boundary (e.g., slot boundary 134) to a second portion of the slot boundary displaced from the first portion of the slot boundary by second dimension D2.

Drive insert assembly 100 (e.g., insert 102, washer 106, 136, 164, 168, and/or rivet 104, 160) described herein, as well as wheel 10 and brake system 40, and the components thereof, may be made from any suitable material. For example, the material may be any material of suitable strength for the intended use of drive insert assembly 100, wheel 10, brake system 40, and the components thereof. In some examples, the material includes a metal or a metal alloy. For example, the material may include a nickel alloy or steel alloy. As one example, the material may include stainless steel.

Drive insert assembly 100, wheel 10, brake system 40, and the components thereof can be formed using any suitable technique. Drive insert assembly 100, wheel 10, brake system 40, and the components thereof may be forged, casted, made from bar stock, additive manufactured (e.g., three-dimensionally (3D) printed), extruded, drawn, or be produced using other suitable methods. In some examples, drive insert assembly 100, wheel 10, brake system 40, and the components thereof may be machined to define the configurations described herein. In other examples, drive insert assembly 100, wheel 10, brake system 40, and the components thereof may be formed without having to be substantially machined.

Drive insert assembly 100, wheel 10, brake system 40, and the components thereof, may be formed to have any shape. In some examples, two or more components of drive insert assembly 100, wheel 10, and brake system 40 are formed to be physically separate from each other and subsequently joined and/or attached to define drive insert assembly 100, wheel 10, and brake system 40. In other examples, two or more components of drive insert assembly 100, wheel 10, and brake system 40 have a unitary body construction, e.g., are formed to be one piece.

In some examples, wheel 10 may be finish machined from a near-net-shaped aluminum forging and contain an axial assembly and/or wheel rim for assembly of brake system 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including brake disc 80, rotor discs 60, 61, 62, 63 and stator discs 64, 65, 66, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure. Surfaces and/or portions of brake disc 80, such as central aperture 82, disc outer perimeter 84, disc slots 86, 88, friction surface 90, disc first side 91, disc second side 93, first disc surface 124, second disc surface 130, third disc surface 148, fourth disc surface 152, first torque face 114, second torque face 116, and other surfaces and/or portions, may be formed using any suitable manner, such as machining.

The present disclosure includes the following examples.

Example 1: An assembly comprising: a rivet defining a rivet head attached to a rivet shank; a washer defining a washer hole; and an insert defining an insert ear configured to cover a surface of a brake disc when the insert positions over a torque face of a slot on a perimeter of the brake disc; wherein the insert ear defines a rivet slot extending through the insert ear, wherein the rivet slot is configured to allow passage of the rivet shank through the rivet slot and into the brake disc to secure the insert to the brake disc, wherein the washer is configured to be positioned between the rivet head and the insert ear when the rivet shank passes through the rivet slot and the washer hole and into the brake disc, and wherein the rivet slot is configured to allow motion of the insert relative to the rivet in a tangential direction of the brake disc when the rivet shank passes through the rivet slot and the washer hole and into the brake disc.

Example 2: The assembly of example 1, wherein the washer defines a countersink and the rivet head is configured to position within the countersink when the washer is positioned between the rivet head and the insert ear.

Example 3: The assembly of example 1 or example 2, wherein the rivet slot defines a first dimension that allows motion of the insert relative to the rivet in the tangential direction when rivet shank passes through the rivet slot and the washer hole and into the brake disc, wherein the rivet slot defines a second dimension perpendicular to the first dimension, and wherein the second dimension is less than the first dimension.

Example 4: The assembly of example 3, wherein the first dimension is measured in a direction is substantially parallel to the tangential direction of the brake disc when the insert ear covers the surface of the brake disc.

Example 5: The assembly of any of examples 1-4, wherein the rivet slot is configured to allow motion of the insert relative to the rivet when the rivet shank passes through the rivet slot and the washer hole and into the brake disc.

Example 6: The assembly of any of examples 1-5, wherein the washer is configured to slidably translate over the insert ear when the washer is positioned between the rivet head and the insert ear and the insert moves relative to the rivet.

Example 7: The assembly of any of examples 1-6, wherein the insert comprises a body section, the body section comprising: a drive face; and a back face opposite the drive face, wherein the back face is configured to engage the torque face of the brake disc when the rivet shank passes through the rivet slot the insert moves in the tangential direction of the brake disc.

Example 8: The assembly of example 7, wherein the insert ear extends from the body section in the tangential direction of the brake disc.

Example 9: The assembly of any of examples 1-8, wherein the surface of the brake disc is on a first side of the brake disc, wherein the insert ear is a first insert ear and the rivet slot is a first rivet slot, wherein the insert further comprises a second insert ear configured to cover a second surface of the brake disc on a second side of the brake disc opposite the first side when the first insert ear covers the surface of the brake disc, wherein the second insert ear defines a second rivet slot extending through the second insert ear in the axial direction of the brake disc, and wherein the second rivet slot is configured to allow passage of the rivet shank through the second rivet slot when the rivet shank passes through the first rivet slot.

Example 10: The assembly of example 9, wherein the rivet defines the rivet head attached to a first end of the rivet shank and further defines a second rivet head attached to a second end of the rivet shank opposite the first end, wherein the washer is a first washer and the washer hole is a first washer hole, the assembly further comprising a second washer defining a second washer hole, wherein the second washer is configured to prevent the second rivet head from passing through the second washer hole when the rivet shank passes through the second rivet slot and second washer hole, and wherein the second washer is configured to be positioned between the second rivet head and the second insert ear when the rivet shank passes through the second rivet slot and the second washer hole.

Example 11: The assembly of example 9 or example 10, wherein the second rivet slot is configured to allow motion of the insert in the tangential direction of the brake disc when the rivet shank passes through the second rivet slot and the second washer hole.

Example 12: The assembly of any of examples 1-11, wherein the torque face comprises a first torque face of the slot and the tangential direction comprises a first tangential direction, wherein the insert is configured to engage the first torque face when the rivet shank passes through the rivet slot and the insert moves in the first tangential direction of the brake disc, and wherein the insert is configured to engage a second torque face of the slot when the rivet shank passes through the rivet slot and the insert moves in a second tangential direction of the brake disc opposite the first tangential direction.

Example 13: The assembly of any of examples 1-12, further comprising the brake disc, wherein the insert ear covers the surface of the brake disc and is positioned over the torque face, wherein the rivet shank passes through the washer hole and the rivet slot and into the brake disc, and wherein the washer is trapped between the rivet head and the insert ear.

Example 14: The assembly of example 13, wherein the rivet slot is configured to permit the insert to move in the tangential direction toward the torque face until the insert contacts the torque face, and wherein the rivet slot is configured such that the rivet is substantially unloaded in the tangential direction when the insert contacts the torque face.

Example 15: The assembly of any of examples 1-14, wherein the rivet is one of a solid rivet, a hollow rivet, or a semi-tubular rivet.

Example 16: An assembly comprising: a brake disc defining a first surface on a first side of the brake disc, a second surface on a second side of the brake disc opposite the first side, and a torque face between the first surface and the second surface; an insert configured to be positioned over the torque face, wherein the insert defines a first insert ear configured to cover the first surface and a second insert ear configured to cover the second surface when the insert positions over the torque face, wherein the first insert ear defines a first rivet slot extending through the first insert ear in an axial direction of the brake disc, and wherein the second insert ear defines a second rivet slot extending through the second insert ear in the axial direction of the brake disc; a first washer defining a first washer hole; a second washer defining a second washer hole; and a rivet defining a first rivet head attached to a first end portion of a rivet shank and defining a second rivet head attached to a second end portion of the rivet shank opposite the first end, wherein the rivet shank is configured to pass through the first washer hole, the first rivet slot, the brake disc, the second washer hole, and the second rivet slot, such that the first washer is between the first rivet head and the first insert ear and the second washer is between the second rivet head and the second insert ear, and wherein the first rivet slot and the second rivet slot are configured to allow motion of the insert relative to the rivet in a tangential direction of the brake disc when the rivet shank is passed through the first washer hole, the first rivet slot, the brake disc, the second washer hole, and the second rivet slot.

Example 17: The assembly of example 16, wherein the torque face defines a portion of a slot on a perimeter of the brake disc, wherein the insert is configured to engage the torque face when the insert moves in a first tangential direction of the brake disc, and wherein the insert is configured to engage a second torque face defining a second portion of the slot when the insert moves in a second tangential direction of the brake disc opposite the first tangential direction.

Example 18: The assembly of example 16 or example 17, wherein at least one of the first rivet slot or the second rivet slot is configured to permit the insert to move in the tangential direction toward the torque face until the insert contacts the torque face, and wherein the at least one of the first rivet slot or the second rivet slot is configured such that the rivet is substantially unloaded in the tangential direction when the insert contacts the torque face.

Example 19: A method, comprising: covering a torque face defining a slot of a brake disc and a surface of the brake disc with an insert, wherein the insert defines an insert ear covering the surface; and extending a rivet shank of a rivet through a washer hole of a washer, through a rivet slot of the insert ear, and into the brake disc to secure the insert to the brake disc as the insert covers the torque face and the surface of the brake disc, such that the washer is between a rivet head of the rivet and the insert ear, wherein the rivet slot is configured to allow motion of the insert relative to the rivet in a tangential direction of the brake disc when the rivet shank passes through the rivet slot and the washer hole and into the brake disc.

Example 20: The method of example 19, further comprising forming, using a riveting tool, the rivet head as the rivet shank passes through the washer hole and the rivet slot and into the brake disc.

Various examples have been described. These and other examples are within the scope of the following claims.

What is claimed is:

1. An assembly comprising:
   a rivet defining a rivet head attached to a rivet shank;
   a washer defining a washer hole; and
   an insert defining an insert ear configured to cover a surface of a brake disc when the insert positions over a torque face of a slot on a perimeter of the brake disc;
   wherein the insert ear defines a rivet slot extending through the insert ear,
   wherein the rivet slot is configured to allow passage of the rivet shank through the rivet slot and into the brake disc to secure the insert to the brake disc,
   wherein the washer is configured to be positioned between the rivet head and the insert ear when the rivet shank passes through the rivet slot and the washer hole and into the brake disc, and
   wherein the rivet slot is configured to allow motion of the insert relative to the rivet in a tangential direction of the brake disc when the rivet shank passes through the rivet slot and the washer hole and into the brake disc.

2. The assembly of claim 1, wherein the washer defines a countersink and the rivet head is configured to position within the countersink when the washer is positioned between the rivet head and the insert ear.

3. The assembly of claim 1,
   wherein the rivet slot defines a first dimension that allows motion of the insert relative to the rivet in the tangential direction when rivet shank passes through the rivet slot and the washer hole and into the brake disc,
   wherein the rivet slot defines a second dimension perpendicular to the first dimension, and
   wherein the second dimension is less than the first dimension.

4. The assembly of claim 3, wherein the first dimension is measured in a direction is substantially parallel to the tangential direction of the brake disc when the insert ear covers the surface of the brake disc.

5. The assembly of claim 1, wherein the rivet slot is configured to allow motion of the insert relative to the rivet when the rivet shank passes through the rivet slot and the washer hole and into the brake disc.

6. The assembly of claim 1, wherein the washer is configured to slidably translate over the insert ear when the washer is positioned between the rivet head and the insert ear and the insert moves relative to the rivet.

7. The assembly of claim 1, wherein the insert comprises a body section, the body section comprising:
   a drive face; and
   a back face opposite the drive face,
   wherein the back face is configured to engage the torque face of the brake disc when the rivet shank passes through the rivet slot the insert moves in the tangential direction of the brake disc.

8. The assembly of claim 7, wherein the insert ear extends from the body section in the tangential direction of the brake disc.

9. The assembly of claim 1,
   wherein the surface of the brake disc is on a first side of the brake disc,
   wherein the insert ear is a first insert ear and the rivet slot is a first rivet slot,
   wherein the insert further comprises a second insert ear configured to cover a second surface of the brake disc on a second side of the brake disc opposite the first side when the first insert ear covers the surface of the brake disc,
   wherein the second insert ear defines a second rivet slot extending through the second insert ear in the axial direction of the brake disc, and
   wherein the second rivet slot is configured to allow passage of the rivet shank through the second rivet slot when the rivet shank passes through the first rivet slot.

10. The assembly of claim 9,
    wherein the rivet defines the rivet head attached to a first end of the rivet shank and further defines a second rivet head attached to a second end of the rivet shank opposite the first end,
    wherein the washer is a first washer and the washer hole is a first washer hole, the assembly further comprising a second washer defining a second washer hole,
    wherein the second washer is configured to prevent the second rivet head from passing through the second washer hole when the rivet shank passes through the second rivet slot and second washer hole, and
    wherein the second washer is configured to be positioned between the second rivet head and the second insert ear when the rivet shank passes through the second rivet slot and the second washer hole.

11. The assembly of claim 9, wherein the second rivet slot is configured to allow motion of the insert in the tangential direction of the brake disc when the rivet shank passes through the second rivet slot and the second washer hole.

12. The assembly of claim 1,
    wherein the torque face comprises a first torque face of the slot and the tangential direction comprises a first tangential direction,
    wherein the insert is configured to engage the first torque face when the rivet shank passes through the rivet slot and the insert moves in the first tangential direction of the brake disc, and
    wherein the insert is configured to engage a second torque face of the slot when the rivet shank passes through the rivet slot and the insert moves in a second tangential direction of the brake disc opposite the first tangential direction.

13. The assembly of claim 1, further comprising the brake disc,
wherein the insert ear covers the surface of the brake disc and is positioned over the torque face,
wherein the rivet shank passes through the washer hole and the rivet slot and into the brake disc, and
wherein the washer is trapped between the rivet head and the insert ear.

14. The assembly of claim 13, wherein the rivet slot is configured to permit the insert to move in the tangential direction toward the torque face until the insert contacts the torque face, and wherein the rivet slot is configured such that the rivet is substantially unloaded in the tangential direction when the insert contacts the torque face.

15. The assembly of claim 1, wherein the rivet is one of a solid rivet, a hollow rivet, or a semi-tubular rivet.

16. An assembly comprising:
a brake disc defining a first surface on a first side of the brake disc, a second surface on a second side of the brake disc opposite the first side, and a torque face between the first surface and the second surface;
an insert configured to be positioned over the torque face, wherein the insert defines a first insert ear configured to cover the first surface and a second insert ear configured to cover the second surface when the insert positions over the torque face,
wherein the first insert ear defines a first rivet slot extending through the first insert ear in an axial direction of the brake disc, and
wherein the second insert ear defines a second rivet slot extending through the second insert ear in the axial direction of the brake disc;
a first washer defining a first washer hole;
a second washer defining a second washer hole; and
a rivet defining a first rivet head attached to a first end portion of a rivet shank and defining a second rivet head attached to a second end portion of the rivet shank opposite the first end,
wherein the rivet shank is configured to pass through the first washer hole, the first rivet slot, the brake disc, the second washer hole, and the second rivet slot, such that the first washer is between the first rivet head and the first insert ear and the second washer is between the second rivet head and the second insert ear, and
wherein the first rivet slot and the second rivet slot are configured to allow motion of the insert relative to the rivet in a tangential direction of the brake disc when the rivet shank is passed through the first washer hole, the first rivet slot, the brake disc, the second washer hole, and the second rivet slot.

17. The assembly of claim 16,
wherein the torque face defines a portion of a slot on a perimeter of the brake disc,
wherein the insert is configured to engage the torque face when the insert moves in a first tangential direction of the brake disc, and
wherein the insert is configured to engage a second torque face defining a second portion of the slot when the insert moves in a second tangential direction of the brake disc opposite the first tangential direction.

18. The assembly of claim 16, wherein at least one of the first rivet slot or the second rivet slot is configured to permit the insert to move in the tangential direction toward the torque face until the insert contacts the torque face, and wherein the at least one of the first rivet slot or the second rivet slot is configured such that the rivet is substantially unloaded in the tangential direction when the insert contacts the torque face.

19. A method, comprising:
covering a torque face defining a slot of a brake disc and a surface of the brake disc with an insert, wherein the insert defines an insert ear covering the surface; and
extending a rivet shank of a rivet through a washer hole of a washer, through a rivet slot of the insert ear, and into the brake disc to secure the insert to the brake disc as the insert covers the torque face and the surface of the brake disc, such that the washer is between a rivet head of the rivet and the insert ear,
wherein the rivet slot is configured to allow motion of the insert relative to the rivet in a tangential direction of the brake disc when the rivet shank passes through the rivet slot and the washer hole and into the brake disc.

20. The method of claim 19, further comprising forming, using a riveting tool, the rivet head as the rivet shank passes through the washer hole and the rivet slot and into the brake disc.

* * * * *